US009174846B2

(12) United States Patent
Beck et al.

(10) Patent No.: US 9,174,846 B2
(45) Date of Patent: Nov. 3, 2015

(54) FERRIC PHOSPHATE AND METHODS OF PREPARATION THEREOF

(75) Inventors: Larry W. Beck, Ann Arbor, MI (US);
Mahrokh Soltani, Ann Arbor, MI (US);
Liya Wang, Ann Arbor, MI (US)

(73) Assignee: A123 Systems LLC, Livonia, MI (US)

( * ) Notice: Subject to any disclaimer, the term of this patent is extended or adjusted under 35 U.S.C. 154(b) by 704 days.

(21) Appl. No.: 12/885,907

(22) Filed: Sep. 20, 2010

(65) Prior Publication Data

US 2011/0068295 A1    Mar. 24, 2011

Related U.S. Application Data

(60) Provisional application No. 61/243,846, filed on Sep. 18, 2009, provisional application No. 61/264,951, filed on Nov. 30, 2009.

(51) Int. Cl.
*C01B 15/16* (2006.01)
*C01B 25/26* (2006.01)
(Continued)

(52) U.S. Cl.
CPC .............. *C01B 25/375* (2013.01); *H01M 4/136* (2013.01); *H01M 4/5825* (2013.01); *H01M 10/052* (2013.01); *Y02E 60/122* (2013.01)

(58) Field of Classification Search
None
See application file for complete search history.

(56) References Cited

U.S. PATENT DOCUMENTS 3,070,423 A * 12/1962 Alexander et al. ............ 423/311
3,407,034 A * 10/1968 Bennetch ...................... 423/311

(Continued)

FOREIGN PATENT DOCUMENTS

CN    1105047 A    7/1995
CN    101172595 A    5/2008
(Continued)

OTHER PUBLICATIONS

Delacourt et al(Synthesis and Thermal Behavior of Crystalline Hydrated Iron (III) Phosphates of Interest as Positive Electrodes in Li Batteries, Chem. Mater, 2003, 15, 5051-5058).*

(Continued)

*Primary Examiner* — Melvin C Mayes
*Assistant Examiner* — Michael Forrest
(74) *Attorney, Agent, or Firm* — Alleman Hall McCoy Russell & Tuttle LLP

(57) ABSTRACT

High-purity crystalline ferric phosphate material with desirable characteristics for use in synthesis of nano-sized LFP cathode material are described. The ferric phosphate dihydrate material has as disclosed herein has a molar ratio of phosphorous to iron is from about 1.001 to about 1.05, a surface area of from about 25 $m^2/g$ to about 65 $m^2/g$, and is substantially free of metallic or magnetic impurities. Methods of synthesizing high-purity crystalline ferric phosphate material with desirable characteristics for use in synthesis of nano-sized LFP cathode material are also described. In some embodiments, one or more magnetic traps are used during the reaction process and/or after the formation of the final product to remove magnetic impurities. In some embodiments, a synthetic method of ferric phosphate using multiple steps is described, wherein the intermediate of the synthesis is isolated and purified to improve the purity of the ferric phosphate material. In some embodiments, an iron compound is added to an aqueous solution of phosphoric acid. The solution pH and temperature are controlled to ensure the complete dissolution of the iron compound. The desired iron phosphate crystalline material can be obtained with high purity and high crystalline phase purity by controlling the pH and temperature of the solution.

22 Claims, 15 Drawing Sheets

(51) Int. Cl.

| | | |
|---|---|---|
| C01G 1/00 | (2006.01) | |
| C01G 49/00 | (2006.01) | |
| C01G 51/00 | (2006.01) | |
| C01G 53/00 | (2006.01) | |
| C22B 1/00 | (2006.01) | |
| C22B 23/00 | (2006.01) | |
| C01B 25/37 | (2006.01) | |
| H01M 4/136 | (2010.01) | |
| H01M 4/58 | (2010.01) | |
| H01M 10/052 | (2010.01) | |

(56) References Cited

U.S. PATENT DOCUMENTS

| | | |
|---|---|---|
| 4,144,163 A | 3/1979 | Kolm |
| 4,374,109 A | 2/1983 | Ruszala et al. |
| 5,030,285 A | 7/1991 | Vallvey et al. |
| 5,053,297 A | 10/1991 | Yamahira et al. |
| 5,278,000 A | 1/1994 | Huang et al. |
| 5,691,083 A | 11/1997 | Bolster |
| 5,910,382 A | 6/1999 | Goodenough et al. |
| 6,514,640 B1 | 2/2003 | Armand et al. |
| 6,528,003 B1 | 3/2003 | Sano et al. |
| 6,599,662 B1 | 7/2003 | Chiang et al. |
| 6,656,635 B2 | 12/2003 | Okawa et al. |
| 6,723,470 B2 | 4/2004 | Barker et al. |
| 6,730,281 B2 | 5/2004 | Barker et al. |
| 6,749,967 B2 | 6/2004 | Li et al. |
| 6,787,232 B1 | 9/2004 | Chiang et al. |
| 6,815,122 B2 | 11/2004 | Barker et al. |
| 6,855,273 B2 | 2/2005 | Ravet et al. |
| 6,884,544 B2 | 4/2005 | Barker et al. |
| 7,001,690 B2 | 2/2006 | Barker et al. |
| 7,026,072 B2 | 4/2006 | Barker et al. |
| 7,190,171 B2 | 3/2007 | Kawakami et al. |
| 7,233,128 B2 | 6/2007 | Brost et al. |
| 7,282,300 B2 | 10/2007 | Goh et al. |
| 7,524,529 B2 | 4/2009 | Yang |
| 7,842,420 B2 | 11/2010 | Wixom et al. |
| 7,988,879 B2 | 8/2011 | Park et al. |
| 2002/0004169 A1 | 1/2002 | Yamada et al. |
| 2002/0039687 A1 | 4/2002 | Barker et al. |
| 2002/0047112 A1* | 4/2002 | Hosoya et al. ............. 257/9 |
| 2004/0005265 A1 | 1/2004 | Chiang et al. |
| 2004/0018430 A1 | 1/2004 | Holman et al. |
| 2004/0033360 A1 | 2/2004 | Armand et al. |
| 2004/0086445 A1 | 5/2004 | Armand et al. |
| 2004/0175614 A1 | 9/2004 | Wurm |
| 2004/0257045 A1 | 12/2004 | Sada et al. |
| 2005/0186476 A1 | 8/2005 | Barker et al. |
| 2005/0233219 A1 | 10/2005 | Gozdz et al. |
| 2005/0266303 A1 | 12/2005 | Kadouchi et al. |
| 2006/0093919 A1 | 5/2006 | Wixom et al. |
| 2006/0127750 A1 | 6/2006 | Okada et al. |
| 2006/0127767 A1 | 6/2006 | Gauthier et al. |
| 2007/0015055 A1 | 1/2007 | Lee et al. |
| 2007/0175830 A1* | 8/2007 | Brassard ............. 210/695 |
| 2008/0138709 A1 | 6/2008 | Hatta et al. |
| 2008/0274210 A1 | 11/2008 | Chan et al. |
| 2009/0039307 A1 | 2/2009 | Nakaoka et al. |
| 2009/0123813 A1 | 5/2009 | Chiang et al. |
| 2009/0186277 A1 | 7/2009 | Beck et al. |
| 2010/0028777 A1 | 2/2010 | Ueda et al. |
| 2010/0178562 A1 | 7/2010 | Exnar et al. |
| 2010/0183924 A1 | 7/2010 | Song et al. |
| 2011/0052988 A1 | 3/2011 | Beck et al. |
| 2011/0068295 A1 | 3/2011 | Beck et al. |
| 2011/0068298 A1 | 3/2011 | Wixom et al. |
| 2011/0117003 A1* | 5/2011 | Wissemborski et al. ...... 423/306 |

FOREIGN PATENT DOCUMENTS

| | | | |
|---|---|---|---|
| CN | 101462704 A | 6/2009 | |
| CN | 101481104 A | 7/2009 | |
| CN | 101659406 A | 3/2010 | |
| GB | 1162711 A | 8/1969 | |
| JP | 11021114 A | 1/1999 | |
| JP | 2003292307 A | * 10/2003 | ............. C01B 25/37 |
| JP | 2003292309 A | 10/2003 | |
| JP | 2004359538 A | 12/2004 | |
| JP | 2005015282 A | * 1/2005 | ............... B03C 1/00 |
| JP | 2007128723 A | 5/2007 | |
| SU | 01724570 A1 | 4/1992 | |
| WO | WO-02/30815 | * 4/2002 | ............. C01B 25/45 |
| WO | WO-0230815 A1 | 4/2002 | |
| WO | WO-03056646 A1 | 7/2003 | |
| WO | WO-03085757 A1 | 10/2003 | |
| WO | WO-2005041327 A1 | 5/2005 | |
| WO | WO-2009050055 A2 | * 4/2009 | ............. C01B 25/37 |
| WO | WO-2010097341 A1 | 9/2010 | |

OTHER PUBLICATIONS

Scaccia et al (Thermoanalytical investigatin of nanocrystalline iron (II) phosphate obtained by spontaneous precipitation from aqueous solutions, Thermochimica Acta, 7138 (2002), 1-7).*

Zhu et al (Novel Synthesis of LiFePO4 by aqueous precipitation and carbothermal reduction, Mat Chem Phys, 98 (2006) 373-376).*

Prosini et al (Synthesis and Characterization of Amorphous Hydrated FePO4 and Its Electrode Performance in Lithium Batteries, J Electrochem Soc, 149 (3) A297-A301 (2002)).*

Schumb et al (Hydrogen Peroxide, Reinhold Publishing Corporation, New York, 1955, pp. 404 and 491).*

Berbenni, et al., "Thermogravimetry and X-ray Diffraction Study of the Thermal Decomposition Processes in Li2CO3-MnCO3 Mixtures", Journal of Analytical and Applied Pyrolysis, 60:45-62 (2002), 19 pages.

International Search Report and Written Opinion for International Application No. PCT/US10/49480 mailed Feb. 1, 2011, 17 pages.

International Search Report and Written Opinion for International Application No. PCt/US2010/046646 mailed Oct. 18, 2010. 7 pages.

International Search Report and Written Opinion for PCT Application No. PCT/US08/69858 mailed Jan. 20, 2009. 11 pages.

International Search Report for International Application No. PCT/US2009/031552 dated Sep. 1, 2009. 4 pages.

Jang, et al., "Electrochemical Cycling-Induced Spinel Formation in High-Charge-Capacity Orthorhombic LiMnO2, Journal of the Electrochemical Society", 146(9):3217-3223 (1999), 8 pages.

Jang, et al., "Stability of the Monoclinic and Orthorhombic Phases of LiMnO2 with Temperature, Oxygen Partial Pressure, and Al Doping", Solid State Ionics, 130:53-59 (2000), 8 pages.

Lee, et al., "Li2NiO2 as a Novel Cathode Additive for Overdischarge Protection of Li-Ion Batteries", Chem. Matter, 20:5-7 (2008), 4 pages.

Meethong, et al., "Strain Accommodation during Phase Transformations in Olivine-Based Cathodes as a Materials Selection Criterion for High-Power Rechargeable Batteries", Advanced Functional Materials, 17:1115-1123 (2007), 9 pages.

Meethong, Size-Dependent Lithium Miscibility Gap in Nanoscale Li$_{1-x}$FePO4, Electrochemical and Solid State Letters, 10(5):A134-A138 (2007), 5 pages.

Song, Yanning et al. "New Iron (III) Phosphate Phases: Crystal Structure and Electrochemical and Magnetic Properties." *Inorg. Chem.* Oct. 2002. vol. 41. pp. 5778-5786.

Striebel et al,, "Comparison of LiFePO4 from Different Sources", Journal of the Electrochemical Society, 152(4) A664-A670 (2005).

Wang et al., "Improving the rate performance of LiFePO4 by Fe-site doping", Electrochimica Acta. vol. 50, No. 14, pp. 2955-2958, May 5, 2005.

Yamada, et al., Phase Diagram of Li$_x$(MN$_y$FE$_{1-y}$)PO4($0 \le x, y \le 1$), Journal of the Electrochemical Society, 148(10):A1153-A1158 (2001), 7 pages.

Yonemura et al., "Comparative Kinetic Study of Olivine Li$_x$MPO4 (M=Fe, Mn)", Journal of Electrochemical Society 151 (9), A1352-A1356 (2004).

* cited by examiner

FERRIC PHOSPHATE AND METHODS OF PREPARATION THEREOF

RELATED APPLICATIONS

This application claims priority to co-pending U.S. Provisional Application 61/243,846, filed Sep. 18, 2009 and entitled "Ferric Phosphate Dihydrate As Lithium Iron Phosphate Synthetic Precursor and Method of Preparation Thereof", and to co-pending U.S. Provisional Application 61/264,951, filed Nov. 30, 2009 and entitled "Ferric Phosphate and Methods of Preparation Thereof", the contents of which are incorporated by reference.

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

This disclosure relates to constructions for battery electrodes, materials used therein, electrodes and subassemblies for electrochemical cells—especially batteries—and methods of manufacture, and electrochemical cells using such electrodes and methods of manufacture.

BACKGROUND

Contemporary portable electronic appliances rely almost exclusively on rechargeable lithium (Li)-ion batteries as the source of power. In a typical Li-ion battery, the cell includes metal oxides for the positive electrode (or cathode), carbon/graphite for the negative electrode (or anode), and a lithium salt in an organic solvent for the electrolyte. More recently, lithium metal phosphates have been used as a cathode electroactive material. Lithium iron phosphate is now recognized as a safe and reliable cathode material for secondary batteries. It is a next-generation replacement for the more hazardous lithium cobalt oxide that is currently used in commercial lithium ion batteries.

Li-ion batteries using lithium iron phosphate (LFP)-based cathode materials are currently found in cordless hand tools and on-board UPS devices. Battery packs have recently been demonstrated for transportation including aviation and rechargeable electric vehicle (REV), plug-in hybrid electric vehicle (PHEV) automobiles and buses.

In order to find more wide-spread application of Li-ion batteries for the transportation industry, an efficient manufacturing process of the nano-phosphate cathode material is needed. Iron (III) phosphate (also referred to as ferric phosphate or iron phosphate) is used in several structural forms as raw material for the LFP production process. In some embodiments, the form is crystalline ferric phosphate dihydrate, which has three related crystal phases, Strengite, Metastrengite I and Metastrengite II. Currently, ferric iron phosphate dihydrate is produced by several commodity bulk suppliers mainly as a food additive, a colorant in ceramic processes, or other purposes using processes generally involving a one-pot oxidation of a iron (II) compound. The iron phosphate produced by this method (or variants) usually has inferior qualities and includes impurities, thus making it less desirable as a precursor for the synthesis of high-quality nano-phosphate LFP. In addition, the characteristics of iron (III) phosphate desired for the synthesis of LFP in lithium ion battery may be very different from those for other intended uses. For example, one requirement for the use of iron phosphate as a nutrient supplement or food additive is that the chemical not contain toxic levels of certain metal contaminants like lead, mercury or chromium-6. In contrast, toxicity is not an important requirement for iron phosphate as a precursor to lithium ion battery application. Similarly, the purity and consistency of ferric phosphate color is a desired characteristic for materials used in the manufacture of ceramics. However, color purity is not primary concern for the synthesis of LFP cathode material for lithium ion battery. Yet another example is the phosphorus to iron ratio. In the animal feed stock application of iron phosphate, the exact ratio of Fe/P is not critical but higher Fe/P ratios is desirable. Thus, the Fe/P ratio may not be carefully controlled and in some instances higher phosphorous content is desired.

The ferric phosphates available from many commodity bulk chemical suppliers (Noah Chemical, Strem Chemical, Alpha Aesar Chemical etc.) contain relatively high levels of sulfate or nitrate anion (0.1-2 wt % impurity anion), as demonstrated by chemical analysis of the ferric phosphates available from these suppliers. This suggests that a common route used by these suppliers to produce ferric phosphate involves a iron salt solution, most commonly ferrous sulfate or ferric nitrate. Ferric phosphate with a high level of anion impurity is not suitable for a raw material for the manufacture of lithium iron phosphate for the use in lithium ion batteries because the impurities are susceptible to reactions that are detrimental to battery operation and/or do not support the electrochemical cycling of the cell.

Other synthetic methods for synthesizing ferric phosphate use iron oxide (Fe (II), Fe (III) or Fe (II/III)), iron hydroxide, iron carbonate, or a combination thereof, as the starting iron material. In such methods the iron oxide or carbonate is reacted with a dilute phosphoric acid solution and an oxidizing agent (if necessary) and heated to produce the crystalline ferric phosphate compound. Despite such recent attempt to improve the quality of ferric phosphate product, commercially available ferric phosphate is still not optimized for the use in lithium ion battery.

Therefore, because the desirable characteristics of iron phosphate precursor for the synthesis of battery-grade LFP are often different from or in contradiction with those for other intended uses, the existing commodity chemical market is an impractical source for iron phosphate as LFP synthesis precursor. In addition, iron phosphate from commercial sources synthesized by the existing one-pot method often has impurities, e.g., sulfate, chloride, and nitrate, which are detrimental to lithium ion batteries. Furthermore, different batches of commercially available iron phosphate material often have inconsistent properties. Thus, there remains a need for the development of a new synthetic method for producing highly pure iron phosphate with consistent and desirable properties for the synthesis of battery-grade LFP.

SUMMARY

High-purity crystalline ferric phosphate material with desirable characteristics for use in synthesis of nano-sized lithium iron phosphate cathode material are described. The ferric phosphate dihydrate material has as disclosed herein has a molar ratio of phosphorous to iron from about 1.001 to about 1.05, a surface area of from about 30 $m^2/g$ to about 55 $m^2/g$, and is substantially free of metallic or magnetic impurities. Methods of synthesizing high-purity crystalline ferric phosphate material with desirable characteristics for use in synthesis of nano-sized lithium iron phosphate cathode material are also described. In some embodiments, one or more magnetic traps are used during any step of the reaction process. In some embodiments, one or more magnetic traps are used after the formation of the final product to remove magnetic impurities. In some embodiments, one or more magnetic traps are used during any step of the reaction process and after the formation of the final product to remove magnetic impurities. In some embodiments, a synthetic method of ferric phosphate using multiple steps is described, wherein the intermediate of the synthesis is isolated and purified to improve the purity of the ferric phosphate material. In some embodiments, an iron compound is added to an aqueous solution of phosphoric acid. The solution pH and temperature are controlled to ensure the complete dissolution of the iron compound. The desired iron phosphate crystalline material can be obtained with high purity and high crystalline phase purity by controlling the pH and temperature of the solution.

As used herein, ferric phosphate, iron phosphate, FP, and iron (III) phosphate are used interchangeably. As used herein, ferrous phosphate and iron (II) phosphate are used interchangeably. The crystalline ferric phosphate dihydrate material comprises less than about 0.5 wt % other alkali or prevalent anion or other salt impurities. Non-limiting examples of other alkali or prevalent anion or other salt impurities include $SO_4$, $NO_3$, Cl, Na, Ca and other alkali or alkaline ions.

As used herein, a material is substantially free of metallic or magnetic impurities if the material comprises less than 100 ppm metallic or magnetic impurities. Examples of metallic or magnetic impurities include, but not limited to iron metal, carbon steel, stainless steel, or iron oxides such as maghemitite or magnetite.

As used herein, ferric phosphate with high purity refer to a iron (III) phosphate with low level of other trace metallic cations (including other transition metals, alkali and alkaline earth metals) wherein each cation impurity is less than 100 ppm. In addition, the high purity ferric phosphate has very low level of other trace anions (including oxo-anions such as nitrate, sulfate, perchlorate, and halides such as fluoride, chloride, bromide etc) wherein each anion impurity is less than 1000 ppm. The high purity ferric phosphate compound can be amorphous or crystalline and may be hydrated. The hydrated crystalline forms of ferric phosphate known as strengite, meta-strengite-I or meta-strengite-II, which are described further herein.

In one aspect, a crystalline ferric phosphate material is described, including:
less than about 1000 ppm sulfate ion;
wherein
the molar ratio of phosphorous to iron is from about 1.001 to about 1.05;
the ferric phosphate material has a surface area of from about 25 $m^2/g$ to about 65 $m^2/g$; and
the ferric phosphate material includes less than 0.8 wt % metallic or magnetic impurities.

In some embodiments, the ferric phosphate material includes ferric phosphate dihydrate; and the ferric phosphate dihydrate includes:
from about 28.3 wt % to about 29.6 wt % iron;
from about 16.0 wt % to about 16.9 wt % phosphorous; and
less than about 700 ppm sulfate ion; and
the ferric phosphate dihydrate material has a surface area of from about 30 $m^2/g$ to about 55 $m^2/g$.

In any of the preceding embodiments, the crystalline ferric phosphate dihydrate material includes less than about 100 ppm metallic or magnetic impurities.

In any of the preceding embodiments, the crystalline ferric phosphate dihydrate material includes less than about 10 ppm metallic impurities.

In any of the preceding embodiments, the crystalline ferric phosphate dihydrate material includes less than about 1 ppm magnetic impurities.

In any of the preceding embodiments, the crystalline ferric phosphate dihydrate material includes less than about 100 ppb magnetic impurities.

In any of the preceding embodiments, a solution of 1 g of the crystalline ferric phosphate dihydrate material in 20 ml of deionized water has a pH value of between about 1 and about 5.

In any of the preceding embodiments, a solution of 1 g of the crystalline ferric phosphate dihydrate material in 20 ml of deionized water has a pH value of between about 2 and about 3.

In any of the preceding embodiments, the crystalline ferric phosphate dihydrate material includes less than about 100 ppm sulfate ion.

In any of the preceding embodiments, the crystalline ferric phosphate dihydrate material includes less than about 0.5 wt % other alkali or prevalent anion or other salt impurities.

In any of the preceding embodiments, the crystalline ferric phosphate dihydrate material includes less than about 0.02 wt % nitrate or chloride.

In any of the preceding embodiments, the crystalline ferric phosphate dihydrate material includes about 19.3 wt % to about 20.8 wt % water.

In any of the preceding embodiments, he crystalline phase of the crystalline ferric phosphate dihydrate is selected from a group consisting of strengite, meta-strengite (I), meta-strengite (II), and mixtures thereof.

In any of the preceding embodiments, the ferric phosphate dihydrate material has a surface area of from about 30 $m^2/g$ to about 55 $m^2/g$.

In any of the preceding embodiments, wherein the primary particle size of the ferric phosphate dihydrate material is between about 1 nm to about 100 nm.

In any of the preceding embodiments, the primary particle size of the ferric phosphate dihydrate material is between about 20 nm to about 40 nm.

In any of the preceding embodiments, the medium size of the aggregate particle of the ferric phosphate dihydrate material is between about 1 μm to about 4 μm.

In any of the preceding embodiments, the medium size of the agglomerated particle of the ferric phosphate dihydrate material is between about 4 μm to about 10 μm.

In another aspect, a method of synthesizing crystalline ferric phosphate material is described, including:
a) introducing an iron (II) salt and a phosphate salt into an aqueous solution to form a ferrous phosphate material and washing the ferrous phosphate to remove impurities; and
b) oxidizing the ferrous phosphate from step a) with an oxidizing agent to form a ferric phosphate material.

In any of the preceding embodiments, the ferric phosphate material includes ferric phosphate dihydrate.

In any of the preceding embodiments, the ferrous phosphate material compromises ferrous phosphate octahydrate.

In any of the preceding embodiments, the method further includes: using one or more metallic traps to remove metallic or magnetic impurities in step a), step b), after step b), or any combination thereof.

In any of the preceding embodiments, the magnetic trap includes rare-earth magnets.

In any of the preceding embodiments, the iron (II) salt is step a) includes iron (II) sulfate, iron (II) chloride, iron (II) nitrate, any hydrate thereof, or a mixture thereof.

In any of the preceding embodiments, the phosphate salt in step a) includes diammonium phosphate.

In any of the preceding embodiments, step a) further includes adding ammonium hydroxide to the solution.

In any of the preceding embodiments, the pH of the resulting solution in step a) is between about 4 to about 5.

In any of the preceding embodiments, the oxidizing agent includes hydrogen peroxide.

In any of the preceding embodiments, step b) further includes adding phosphorous acid.

In any of the preceding embodiments, step b) further heating the solution at a temperature of between about 35 to about 65° C.

In any of the preceding embodiments, the method further includes:
 c) heating the solution at a temperature of between about 85 to about 100° C.

In any of the preceding embodiments, the method further includes washing the resulting crystalline ferric phosphate dihydrate material to a purity level of about 95% to about 99%.

In any of the preceding embodiments, the synthesized crystalline ferric phosphate dihydrate material includes:
 from about 28.3 wt % to about 29.6 wt % iron; from about 16.0 wt % to about 16.9 wt % phosphorous; and less than about 0.8 wt % sulfate ion;
 wherein
 the molar ratio of phosphorous to iron is from about 1.001 to about 1.05;
 the ferric phosphate dihydrate material has a surface area of from about 25 $m^2/g$ to about 65 $m^2/g$; and
 the ferric phosphate dihydrate material is substantially free of metallic or magnetic impurities.

In yet another aspect, a method of synthesizing crystalline ferric phosphate material is described, including:
 a) combining iron (II) compound and an oxidizing agent in an aqueous solution and forming amorphous ferric phosphate and washing the amorphous ferric phosphate to remove impurities; and
 b) crystallizing the amorphous ferrous phosphate from step a) to form a crystalline ferric phosphate material.

In any of the preceding embodiments, one or more metallic traps are used to remove metallic or magnetic impurities in step a), step b), after step b), or any combination thereof.

In any of the preceding embodiments, the ferric phosphate material includes ferric phosphate dihydrate.

In any of the preceding embodiments, the magnetic trap includes rare-earth magnets.

In any of the preceding embodiments, the iron (II) phosphate is formed by combining an iron (II) salt and a phosphate salt.

In any of the preceding embodiments, the iron (II) salt includes iron (II) sulfate, iron (II) chloride, iron (II) nitrate, any hydrate thereof, or a mixture thereof.

In any of the preceding embodiments, the iron (II) salt includes iron (II) sulfate heptahydrate.

In any of the preceding embodiments, the phosphate salt includes diammonium phosphate.

In any of the preceding embodiments, the oxidizing agent includes hydrogen peroxide.

In any of the preceding embodiments, step a) further includes heating the solution at a temperature between about 30 to about 65° C.

In any of the preceding embodiments, step b) further includes adding phosphoric acid.

In any of the preceding embodiments, step b) further includes: heating the solution at a temperature between about 85 to about 100° C.

In any of the preceding embodiments, the method further includes washing the resulting crystalline ferric phosphate material.

In any of the preceding embodiments, the synthesized crystalline ferric phosphate dihydrate material includes:
 from about 28.3 wt % to about 29.6 wt % iron;
 from about 16.0 wt % to about 16.9 wt % phosphorous; and
 less than about 0.8 wt % sulfate ion;
 wherein
 the molar ratio of phosphorous to iron is from about 1.001 to about 1.05;
 the ferric phosphate dihydrate material has a surface area of from about 25 $m^2/g$ to about 65 $m^2/g$; and
 the ferric phosphate dihydrate material is substantially free of metallic or magnetic impurities.

In yet another aspect, a method for manufacture of a crystalline ferric phosphate material having a reaction mixture, one or more reactants, one or more intermediate products, and a ferric phosphate dihydrate product, the method including
 using one or more magnetic traps to remove metallic or magnetic impurities from the reactant, the intermediate product, the reaction mixture, or the ferric phosphate dihydrate product.

In any of the preceding embodiments, the method uses a starting material including an iron (II) or iron (III) compound.

In any of the preceding embodiments, the ferric phosphate material includes ferric phosphate dihydrate.

In any of the preceding embodiments, the method includes one or more synthetic steps and the one or more magnetic traps are used before, during, or after any one of the synthetic steps, or any combination thereof.

In any of the preceding embodiments, the metallic trap includes rare-earth magnets.

In any of the preceding embodiments, the magnet trap has a magnetic strength in the range of 1 to 20 k Gauss.

In any of the preceding embodiments, the magnet trap has a magnetic strength in the range of 8 to 14 k Gauss.

In any of the preceding embodiments, the method further includes:
 a) combining an iron (II) or iron (III) compound and phosphoric acid in an aqueous solution;
 b) maintaining uniform pH and a temperature of the solution to ensure substantially all of the iron (II) or iron (III) compound is consumed by the reaction with phosphoric acid; and
 c) controlling the pH and the temperature of the solution to form the ferrous phosphate material with substantially pure crystalline phase;
 wherein the one or more metallic traps is used to remove metallic or magnetic impurities in step a), step b), step c), after step c), or any combination thereof.

In any of the preceding embodiments, the ferric phosphate material includes ferric phosphate dihydrate.

In any of the preceding embodiments, the magnetic trap includes rare-earth magnets.

In any of the preceding embodiments, the iron (II) or iron (III) compound includes iron (II) or iron (III) oxide, hydroxide, carbonate, or oxy-hydrate.

In any of the preceding embodiments, the iron (II) compound is used and step a) further includes adding an oxidizing agent.

In any of the preceding embodiments, the oxidizing agent includes hydrogen peroxide, dissolved air or oxygen, or other mild oxidant.

In any of the preceding embodiments, the phosphoric acid aqueous solution has a water:phosphoric acid ratio of about 1:1 to about 10:1.

In any of the preceding embodiments, the phosphoric acid aqueous solution has a water:phosphoric acid ratio of about 1:1 to about 4:1.

In any of the preceding embodiments, the pH value of the solution in step b) is maintained as less than about 2.

In any of the preceding embodiments, the pH value of the solution in step b) is maintained as less than about 1.

In any of the preceding embodiments, the temperature of the solution in step b) is maintained above 65° C.

In any of the preceding embodiments, the temperature of the solution in step b) is maintained above 70° C.

In any of the preceding embodiments, the temperature of the solution in step b) is maintained above 75° C.

In any of the preceding embodiments, the temperature of the solution in step b) is maintained above 95° C.

In any of the preceding embodiments, the ferric phosphate material has a metallic or magnetic impurities of less than 100 ppm.

In any of the preceding embodiments, the ferric phosphate material has a metallic or magnetic impurities of less than 10 ppm.

In any of the preceding embodiments, the ferric phosphate material has a metallic or magnetic impurities of less than 1 ppm.

In any of the preceding embodiments, the ferric phosphate material has a metallic or magnetic impurities of less than 100 ppb.

In any of the preceding embodiments, the substantially pure crystalline phase of ferric phosphate is meta-strengite-I.

In any of the preceding embodiments, the substantially pure crystalline phase of ferric phosphate is meta-strengite-II.

In any of the preceding embodiments, the substantially pure crystalline phase of ferric phosphate is strengite.

In any of the preceding embodiments, the pH value of the solution in step c) is controlled as less than about 1.

In any of the preceding embodiments, the temperature of the solution in step c) is controlled at less that about 85° C.

In any of the preceding embodiments, the substantially pure crystalline phase of ferric phosphate is meta-strengite-II.

In any of the preceding embodiments, the substantially pure crystalline phase of ferric phosphate is meta-strengite-II.

In any of the preceding embodiments, the pH value of the solution in step c) is controlled in the range of between about 1 and about 2.

In any of the preceding embodiments, the temperature of the solution in step c) is controlled at less that about 85° C.

In any of the preceding embodiments, the substantially pure crystalline phase of ferric phosphate is meta-strengite-I.

In any of the preceding embodiments, the substantially pure crystalline phase of ferric phosphate is meta-strengite-I.

In any of the preceding embodiments, the solution in step c) is passed through one or more high-strength magnetic flux traps.

In any of the preceding embodiments, the magnetic trap includes a strong magnet directly inserted into the solution to generate a magnetic field.

BRIEF DESCRIPTION OF THE DRAWING

The subject matter is described with reference to the following figures, which are presented for the purpose of illustration only and are not intended to be limiting of the invention.

FIG. 15 is a microscope images of iron dendrite spots penetrating a polyolefin separator film removed from a lithium-ion battery, in which FIG. 15A is of the separator surface facing the positive electrode and FIG. 15B is of the same iron spot on the separator facing the negative electrode.

DETAILED DESCRIPTION

Figure 1:
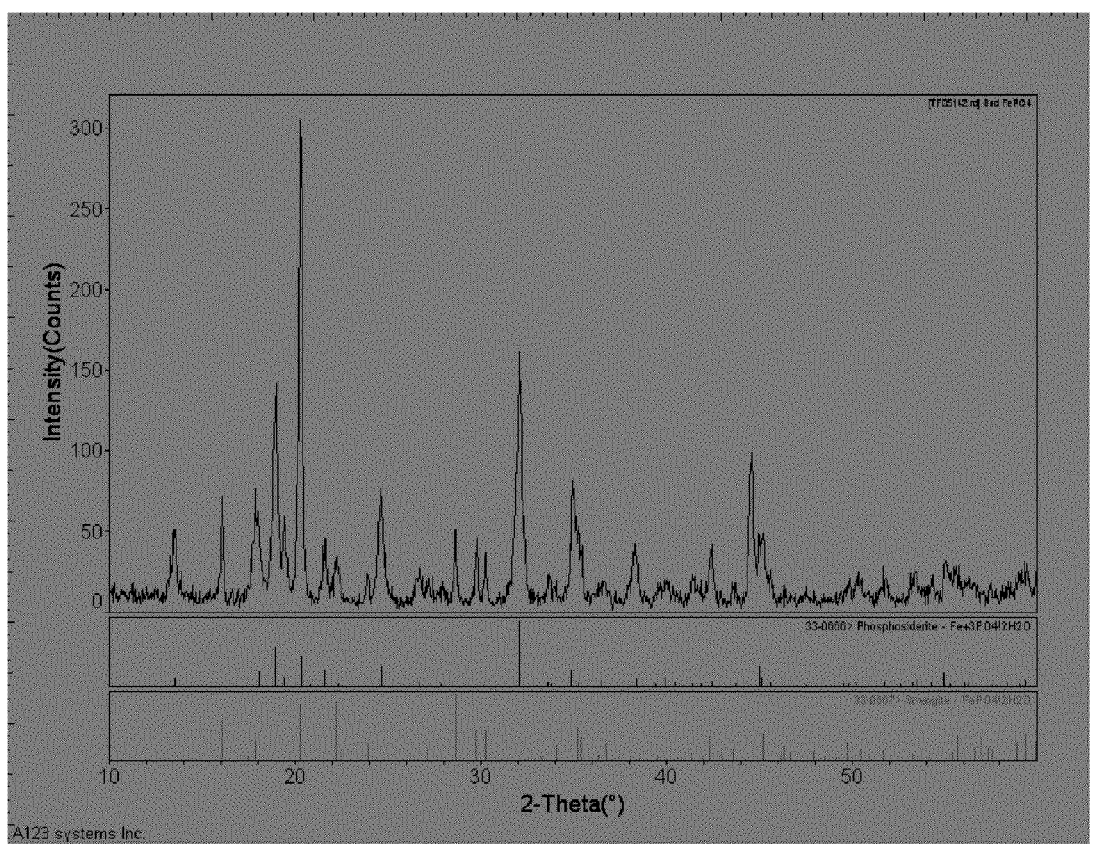
FIG. 1 is a X-ray diffraction powder pattern for iron phosphate sample 1, showing mixture of two phases.
Figure 2:
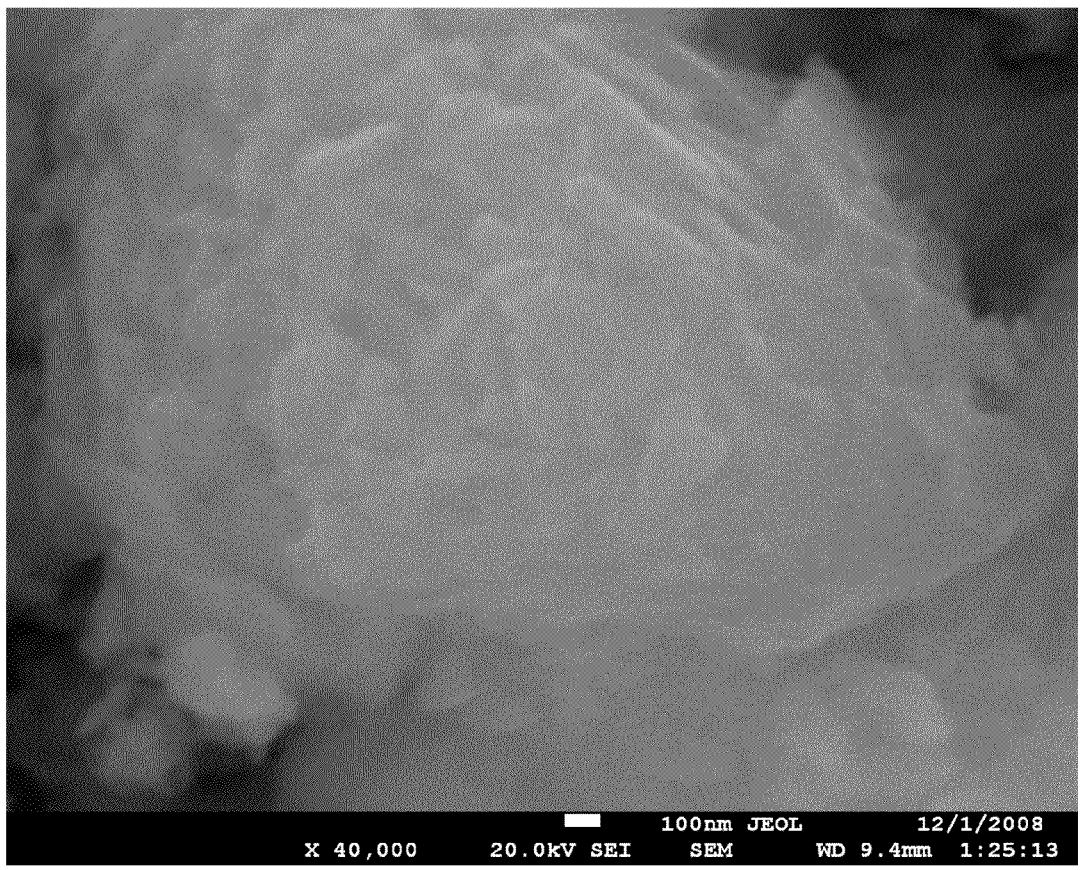
FIG. 2 is a high-resolution SEM image of iron phosphate Sample 1, showing a wide distribution of crystal sizes from <100 nm to >1 um.

High-purity crystalline ferric phosphate material with desirable characteristics for use in synthesis of Nano-sized LFP cathode material and the method of making thereof are described.

Materials

In one aspect, the crystalline ferric phosphate dihydrate material has an iron content of about 28.3 wt % to about 29.6 wt %. In some embodiments, the iron content is about 95 to about 99% theoretical purity based on iron for ferric phosphate dihydrate. Lower iron content (less than 28.3 wt %) may correspond to one or more of following undesirable properties of a precursor for a battery cathode material: high moisture content, high sulfate or other impurity, low degree of crystallinity. Higher iron content (more than 29.6 wt %) may correspond to one or more of the following undesirable properties of a battery precursor material: low crystalline water content, low crystallinity, low phosphate content, iron oxide impurity, iron containing metallic impurity, ferrous impurity e.g. as ferrous phosphate tetrahydrate.

In some embodiments, the crystalline ferric phosphate dihydrate material is substantially free of metallic or magnetic impurities. Non-limiting examples of metallic or magnetic impurities include steel, chrome-steel, stainless steel, iron, iron oxides (ferrous oxides, ferric oxides, iron (II, III) oxides), and other metal or metal oxides. The crystalline ferric phosphate dihydrate material is substantially free of metallic or magnetic impurities when the ferric phosphate dihydrate material comprises less than about 1000 ppm, less than about 200 ppm, or less than about 100 ppm metallic or magnetic impurities. In some embodiments, the crystalline ferric phosphate dihydrate material comprises less than about 100 ppm metallic or magnetic impurities. In some embodiments the crystalline ferric phosphate dihydrate material comprises less than about 10 ppm metallic or magnetic impurities. Iron phosphate with low levels of iron oxide and/or metallic iron impurities is desirable and suitable for the production of high purity LFP for battery applications. Iron oxides and metallic impurities such as carbon-steel or stainless steel in the LFP battery material can be electrochemically unstable and cause irreversible capacity loss, i.e. capacity fade, in the battery over time.

In some embodiments, the iron phosphate dihydrate has low trace metal impurities. In some embodiments, the crystalline ferric phosphate dihydrate material includes less than about 0.8 wt % metallic or magnetic impurities. In some embodiments, the iron phosphate dihydrate has low trace metal impurities. In some embodiments, the crystalline ferric phosphate dihydrate material includes less than about 0.1 wt % metallic or magnetic impurities. Low oxidation potential transition metals, such as Cu and Zn that can migrate to anode and deposit on the anode can decrease lithium ion battery life and capacity fade. High levels of alkali or alkaline earth metals, e.g., about 1,000 ppm or greater Na, K, Ca, Mg, can substitute for lithium and block lithium ion diffusion path through olivine lattice.

Consistent iron content of the iron phosphate dihydrate allows the correct stoichiometry and formulation of nano-sized LFP (or doped olivine) to be produced from the precursor material. The reversible change of oxidation state of iron ($Fe^{2+} \leftrightarrows Fe^{3+}$) in LFP is accompanied by the reversible intercalation of lithium ion into the battery giving rise to the energy storage. Therefore an accurate amount of lithium to match the available iron content in the synthesis mixture is desirable in order to produce a high capacity cathode material for lithium ion battery.

The iron content in iron phosphate as described herein contributes to the high reversible energy storage capacity of LFP. In some embodiments, the specific energy capacity of the LFP battery material produced from the iron phosphate dihydrate can be in the range of 140 mAhr/g to 165 mAhr/g.

The crystalline ferric phosphate dihydrate material has a phosphorus content of about 16.0 wt % to about 16.9 wt %. In some embodiments, the phosphate content is 96-102% of the theoretical purity based on phosphorus for ferric phosphate dihydrate. Lower phosphate content may correspond to one or more of the following undesired conditions: iron oxide impurity, iron containing metallic impurity, high moisture content, high sulfate, chloride, nitrate or other anion impurity, ferrous ion impurity e.g. ferrous phosphate impurity. Higher phosphate content may correspond to one or more of the following undesired conditions: phosphate rich impurities such as $NH_4H_2PO_4$, $NH_4FePO_4$, low iron content, low crystalline water content and low degree of crystallinity.

In some embodiments, a consistent phosphate of the iron phosphate raw material allows the correct stoichiometry and formulation of the nano-sized LFP (or doped olivine) to be produced from the precursor material.

In some embodiments, a stable phosphate content where the molar phosphate content is equal to or slightly greater than the total redox active metal content (e.g. Fe, Mn, Co, Ni, V) in the nano-sized LFP (or doped olivine) is used. The high phosphate content of nano-sized LFP is more stable both electrochemically and thermally than other lithium-oxide battery chemistries based on metal oxides, which are susceptible to thermal run-away under certain conditions. The high phosphate content from the iron phosphate dihydrate helps to minimize or eliminate metal oxide impurities from being incidentally formed during the production (synthesis) of nano-sized LFP or doped olivine.

The crystalline ferric phosphate dihydrate material has low levels of non-phosphate anions. The high phosphate content of the iron phosphate dihydrate correlates to a low impurity of other less desired anions in the material. For example, sulfate, chloride, and nitrate anions are sometimes found in commodity iron phosphates available in the market. These anions are not as stable as phosphate under the electrochemical environment in the lithium ion battery. For example, chloride anion can be oxidized producing chlorine gas which can contribute to an undesired gas pressure inside a sealed lithium ion battery. A high sulfate impurity in the cathode can be soluble in the lithium ion battery electrolyte and if transported to the battery's anode can reduce to form sulfide. Without wishing to be bound by any particular theory, it is believed the deposition of sulfide at the lithium ion battery anode can degrade the stability and function of the anode leading to shortened battery life and/or reduced energy storage capacity.

In some embodiments, the iron phosphate dihydrate has low sulfate, chloride, and nitrate impurity. In some embodiments, the sulfate content in the iron phosphate dihydrate is less than about 0.5 wt %. A higher sulfate content in the iron phosphate dihydrate material has been associated with coarsening of the LFP particles.

Applicants have surprisingly found that residue sulfate in the iron phosphate could contribute to decreased battery life and battery capacity fade in a lithium ion battery. In some embodiments, the iron phosphate material comprises less than 1000 ppm sulfate ion. In some embodiments, iron phosphate material comprises less than 700 ppm sulfate ion.

Chloride or nitrate can be oxidized in the lithium ion battery under normal charging conditions that can lead to undesirable gas pressure in the battery.

In some embodiments, the crystalline ferric phosphate dihydrate material has a molar ratio of phosphorous to iron is from about 1.001 to about 1.050. Phosphorus to iron ratio greater than one in iron phosphate is used as a precursor for synthesizing LFP, compared to theoretical ratio of one in iron phosphate dihydrate. A phosphate to iron ratio of less than 1 may indicate one or more undesirable attribute of the iron phosphate raw material: iron oxide impurity, iron containing metallic impurity, a ferrous ($Fe^2$) impurity such as ferrous phosphate.

Phosphorus to iron ratio of less than one in iron phosphate may lead to secondary iron rich phases during the nano-sized LFP or doped olivine synthesis. The presence of either iron oxide or metallic iron phases in the nano-sized LFP cathode of a lithium ion battery can result in decreased battery life or capacity fade.

In some embodiments, a P/Fe ratio is in the range of 1.050 to 1.001. In some embodiments, a P/Fe ratio is in the range of 1.03 to 1.01.

An iron phosphate dihydrate with a phosphorus to iron ratio greater than one usually has an acidic nature (pH typically in the range of 1 to 5). Without being bound to a particular theory, it is envisioned that the excess phosphate of the ferric phosphate precursor are protonated giving the required charge neutrality of the precursor. The excess phosphate may be at or near the surface or in the bulk of the ferric phosphate particles. The excess of phosphate in the iron phosphate dihydrate may be written as co-precipitated phase impurity to the bulk ferric phosphate hydrate such as $Fe_2(HPO_4)_3\text{-}xH_2O$. But this notation is not meant to imply the excess phosphate is found exclusively in a distinct secondary crystalline impurity. But rather is thought to be uniformly distributed as an amorphous component of the bulk of the iron phosphate dihydrate. The specific advantages the acidic character of the iron phosphate dihydrate in the synthesis of nano-sized LFP (or doped olivine) is described herein.

In some embodiments, the ferric phosphate as described herein is slightly acidic. In some embodiments, when 1 g of the ferric phosphate described herein is dissolved in 20-ml deionized water, the pH of the resulting solution is less than or equals to 4. In some embodiments, when 1 g of the ferric phosphate described herein is dissolved in 20-ml deionized water, the pH of the resulting solution is in the range of between about 1 to about 5. In some embodiments, the pH of the resulting solution of iron phosphate dihydrate measured by this method is between about 2 to about 3. In some embodiments, the iron phosphate dihydrate is typically acidic and has a phosphorus to iron ratio greater than one. Ferric phosphate with a phosphate to iron ratio less than one is typically neutral or slightly basic. The alkaline nature of such ferric phosphate may result from the presence of oxide or hydroxide as required to balance the positive charge from the excessive iron fraction.

The actual water content of the iron phosphate dihydrate is typically higher than 100% the theoretical water content. Due to the relatively high surface area (specified herein) and the hygroscopic nature of iron phosphate, there could be about 0.1 wt % to about 3 wt % physisorbed moisture (weakly bound or absorbed moisture). This is in addition to the crystalline water of hydration in the crystalline phases. In addition there appears to be a correlation between excess phosphate content and excess water content in the iron phosphate dihydrates. The excess phosphate in the material may be found at the particle surface and absorb additional water to stabilize the protonated phosphate surface.

In some embodiments, water content in iron phosphate is lower than about 21 wt %. Higher water content may result in a decrease in iron and phosphate in the precursor. Water in the precursor may be removed in a high temperature drying step prior to nano-sized LFP (doped-olivine) crystallization. Therefore the water content in the iron phosphate precursor does not contribute to the battery performance or specific energy density of the final nano-sized LFP produced by the synthesis procedure.

In some embodiments, crystalline phases of iron phosphate dihydrate include strengite, meta-strengite (I) and meta-strengite (II) (also called phosphosiderite) which has a common chemical formula of $FePO_4\text{-}2H_2O$. The theoretical water content for these iron phases is 19.3 wt %. In some embodiments, a ferric phosphate dihydrate has water content in the range of about 19.3 wt % to about 20.8 wt %.

In some embodiments, iron phosphate dihydrates may contain a fraction of amorphous (non crystalline) material. This higher amorphous fraction is usually correlated with a higher water content. The excessive water content corresponds to a lower iron and phosphate content.

In some embodiments, iron phosphate dihydrate is a crystalline material that can include strengite, meta-strengite (I) and meta-strengite (II), or a mixture of any of these crystalline phases. In some embodiments, the crystal phase of iron phosphate is meta-strengite (II), or phosphosiderite. Small amounts of other crystal phases (<15 wt %) such as sphenicidite $(NH_4)FePO_4OH\text{—}H_2O$, and unnamed phase $Fe_2(HPO_4)_3\text{-}4H_2O$, vivianite $Fe_3(PO_4)_2\text{-}xH_2O$ can be present.

In some embodiments, these other crystalline phases are found in fractions of less than about 5 wt %. In some embodiments, iron phosphate dihydrate contains less than 5 wt % of a non crystalline or amorphous phase.

The crystallinity of the iron phosphate will likely affect the properties of the lithium iron phosphate. The morphology of the iron phosphate precursor can be important to the characteristics of the nano-sized LFP produced from that raw precursor. First is the primary particle size or the crystallite grain size of the smallest distinct constituent particle. Secondly, the secondary particle size and density being made up of aggregates of co-precipitated smaller primary distinct particles are also important. The density and packing of the primary particles affects the tap density and hardness of the secondary aggregates that impact the subsequent use in the synthesis and production of nano-sized LFP. Thirdly, the size of the agglomerated particle of the ferric phosphate dihydrate material is also very important.

In some embodiments, the primary particle size of the crystalline ferric phosphate dihydrate material is between about 1 nm to about 100 nm. In some embodiments, the primary particle size of the ferric phosphate dihydrate material is between about 20 nm to about 40 nm. In some embodiments, the size of the aggregate particle of the ferric phosphate dihydrate material is between about 1 μm to about 4 μm. In some embodiments, the size of the agglomerated particle of the ferric phosphate dihydrate material is between about 4 μm to about 10 μm.

In some embodiments, the primary particle size of the iron phosphate dihydrate is in the range of about 10 nm to about 100 nm, which correlates with high capacity retention at high rates for nano-sized LFP. In some embodiments, the primary particle size of about 20 nm to about 40 nm correlates with a high capacity retention of about 85% at discharge rates up to 10C (discharge full capacity in 1/10 hour). Batteries made with nano-sized LFP (doped olivine) that have such a high rate capacity retention are ideally suited for high power demand applications such as hybrid electric vehicles or portable cordless tools. Iron phosphates of smaller crystalline grain size have correspondingly more amorphous (less crystalline) and are less desired for nano-sized LFP synthesis. Samples with much larger grain size will produce nano-sized Li iron phosphate material with correspondingly larger crystalline domains that exhibit limited lithium ion transport kinetics.

In some embodiments, the secondary morphology of the iron phosphate dihydrate is fairly dense with high packing density in the range of 0.5 to 1 as estimated by dry powder tapped density measurement. In some embodiments, a tap density is in the range of 0.7 to 1 so that the powder can be handled and stored more efficiently in large quantities.

In some embodiments, the secondary particle morphology of the iron phosphate dihydrate is comprised of an aggregate well crystallized and distinct nano-sized crystals without a large fraction (about 5 wt %) of amorphous iron phosphate. Crystalline as opposed to amorphous iron phosphate is more abrasive during milling processes and can reduce the other precursor materials (for example lithium carbonate) resulting in a more homogeneous mixture at the end of the homogenizing process. Also, secondary aggregate particles comprise well crystallized and distinct nano-sized particles which can be characterized in SEM micrographs. Such secondary aggregate particles can be separated during the high energy milling process resulting in a very homogenous mixture at completion of the homogenization process step.

In some embodiments, the specific surface of the iron phosphate dihydrate is between 25 and 65 m²/g (BET). In some embodiments, the specific surface of the iron phosphate dihydrate is between 30 and 55 m²/g (BET). In some embodiments, the specific surface of the iron phosphate dihydrate is between 30 and 50 m²/g (BET). Specific surface area is an easily quantifiable characteristic corresponding to the particle morphology. The primary particle size or smallest distinct crystalline particle places the upper bound on the measured specific surface area. And the packing density and degree of primary particle sintering reduces the accessible surface area to some degree.

Materials with very high fraction of amorphous (non-crystalline) iron phosphate will have a corresponding high surface area. Iron phosphate with high fractions of amorphous iron phosphate includes inexact stoichiometry, higher than desired water content.

In some embodiments, the iron phosphate precursor is highly crystalline with primary particle size in the range of about 20 nm to about 40 nm composed in aggregates with distinct and not highly sintered primary particles. Such a iron phosphate dihydrate could be expected to have a measured specific surface area in the range of about 30 to about 50 m²/g. Nano-sized LFP synthesized with this iron phosphate dihydrate by the process described herein could be used in a lithium ion battery for high power applications demanded for example by hybrid vehicle driving conditions.

Methods

In another aspect, a method for the synthesis of iron phosphate dihydrate precursor for production of LFP doped olivine for lithium ion battery cathode material is described.

In some embodiments, a method of synthesizing high-purity crystalline ferric phosphate dihydrate material substantially free of metallic or magnetic impurities is described, comprising using one or more magnetic traps are used to remove metallic or magnetic impurities. In some embodiments, the method comprises one or more synthetic steps and the one or more magnetic traps are used before, during, or after any one of the synthetic steps, or any combination thereof. In some embodiments, the metallic trap comprises rare-earth magnets. In some embodiments, more than one magnetic traps are implemented in parallel or in series to increase the overall effectiveness of the impurity screening. In some embodiments, the strength of the magnets comprising the traps is in the range of 1-20 k Gauss. In some embodiments, strength of the magnets comprising the traps is in the range of 8 to 14 k Gauss.

The one or more magnetic traps can be implemented at any step of the synthesis, or at multiple steps of the synthesis. The one or more magnetic traps can also be implemented after the formation of the final product, iron phosphate. In some embodiments, the magnetic separation and trapping of the iron oxide or metallic iron impurity is implemented prior to the onset of crystallization of the white or light pink strengite or meta-strengite phase. In other embodiments, the magnetic separation and trapping of the contaminant occur after the crystallization and before the final product is filtered and rinsed prior to drying.

In some embodiments, a metallic material is used in one or more synthetic steps of the iron phosphate synthesis. In some specific embodiments, metallic materials such as iron oxides or iron metal can be used as the starting material for the synthesis of iron phosphate. In these specific embodiments, one or more magnetic traps can be used after the synthetic step involving iron oxides or iron metal to remove residue metallic materials to reduce the level of metallic impurities in the final product, iron phosphate. In some embodiments, one or more magnetic traps are used in synthetic method or step that does not involve any metallic or magnetic reactant materials. In some specific embodiments, a non-magnetic material, e.g., ferrous sulfate or ferrous chloride, is used as the starting material for the synthesis and one or more magnetic traps are used in the process to reduce the level of magnetic impurities in the final product, iron phosphate.

The use of metallic or magnetic reactants in the synthesis may contribute to the magnetic impurities in the final product, iron phosphate. Applicants have surprisingly found that even in synthetic method that does not involve any metallic or magnetic reactant materials, one or more magnetic traps may still be necessary to reduce the level of metallic impurities of the iron phosphate. Without being bound to any particular theory, it is believed that metallic impurities from sources other than the metallic or magnetic reactants may also contribute to the magnetic impurities in iron phosphate product. For instance, magnetic or metallic impurities may be introduced due to metal on metal grinding resulting from the use of metal equipment in the various process steps of the synthesis.

The iron phosphate produced by the improved methods according to any of the embodiments described herein has ultra-lower amount of occluded iron oxide, iron hydroxide, iron, steel or stainless steel contaminant than the conventional ferric phosphate product(s) available in the commercial market. Without being bound to any particular theory, it is thought that the effective use of magnetic traps contributes to the low level of the iron compound impurities or magnetic impurities. In some embodiments, the shear forces applied to the solution and the flow velocity of the solution passing through the strong magnetic gradient field are properly controlled to ensure the near complete removal of the magnetic impurities. In some embodiments, the judicious use of multiple traps (in series or parallel) contributes to the low level of the iron compound impurities or magnetic impurities. In some embodiments, the magnetic contaminant in the resulting ferric phosphate is less than 1 ppm. In some embodiments, the magnetic contaminant in the resulting ferric phosphate is less than 100 ppb.

In other embodiments, a strong magnet is directly inserted into the mixing and reaction tank, without the need for an external circulation loop. In these embodiments, the trap efficiency of the magnet will depend on the proper spatial arrangement of the magnets within the mixing tank and the proper fluid flow rate to avoid the shear-force extraction of magnetic contaminant from the magnet poles.

Conventional method for the synthesis of iron phosphate usually involves an "one-pot" oxidation of certain iron (II) compound. In a "one-pot" procedure, rather than conducting the reaction in a sequence of separate stages, the reagents and materials used are mixed together in a single vessel and allowed to react without separation of any of the intermediates. However, because all reagents are mixed in "one-pot" and the product iron phosphate is washed only once, it is often difficult to completely remove reaction impurities from the product. As a result, the synthesized iron phosphate often contain high concentration of impurities such as sulfate, chloride, nitrate, metal, metal oxides and other magnetic materials.

In an example of the conventional method, an aqueous solution of ferrous (II) sulfate can be oxidized with hydrogen peroxide or similar strong oxidizing agent, with the addition of a strong acid, to yield an aqueous ferric solution (Equation I). The phosphate and ferric solutions are mixed with rapid stirring and homogenization to prevent gelation of the amorphous precipitate (Equation II). The amorphous ferric phosphate precipitate slurry may be heated to 80° C. or between 85-100° C. to crystallize ferric phosphate dihydrate (Equation III). By this conventional "one-pot" method the crystalline phase as characterized by powder, x-ray diffraction, XRD, is typically Metastrengite II, or Metastrengite I, or Strengite depending on the pH of the final aqueous solution during the high-temperature crystallization process. The most acidic, pH conditions, pH<1.0 produce essentially pure metastrengite I, also called phosphosiderite in the literature. In the pH range of 1-2 the meta-stable meta-strengite II phase is observed. At higher pH conditions pH>2 produce strengite as the predominant crystalline phase.

$$Fe(II)SO_4 \cdot 7H_2O(aq) + \tfrac{1}{2}H_2SO_4 + \tfrac{1}{2}H_2O_2 \rightarrow \tfrac{1}{2}Fe(III)_2(SO_4)_3(aq) + H_2O \qquad \text{I}$$

$$\tfrac{1}{2}Fe(III)_2(SO_4)_3 + Na_3PO_4(aq) \rightarrow Fe(III)PO_4 \cdot xH_2O(s) + 1.5Na_2SO_4(aq) \qquad \text{II}$$

$$Fe(III)PO_4 \cdot xH_2O(s) \rightarrow Fe(III)PO_4 \cdot 2H_2O(s) @ T>80° C. \qquad \text{III}$$

Usually, all steps of the synthesis in the conventional method or variations thereof, e.g., steps in Equations I, II, and III, are performed in one-pot. Thus, the resulting products from each step are used directly for the following step without independent purification. Therefore, as a result, the impurities from the previous reaction, such as sulfate, chloride, nitrate, metal, metal oxides and other magnetic materials, are carried over to the next reaction, and into iron phosphate material as the final product. Those impurities, if carried into the lithium iron phosphate material synthesized from iron phosphate, could result in inferior battery characteristics.

Novel two-pot methods of synthesizing iron phosphate dihydrate are described herein, which includes an additional step where the intermediates of the synthesis can be washed thoroughly thus resulting in iron phosphate dihydrate with significantly reduced impurities.

Two-Pot Iron Phosphate Synthesis Method A

A method involving a two-step (two-pot) synthesis of iron phosphate dihydrate is described herein. The ferrous phosphate is precipitated and washed in the first step, followed by a solid-state oxidation and crystallization of the desired ferric phosphate product in the second step. The ferric phosphate produced by this method is superior to materials made by some variation of the generally described "conventional" routes described above.

In the first step, an aqueous solution of a phosphate salt is added to an aqueous solution of a ferrous salt. Non-limiting examples of iron (II) salt include iron (II) sulfate, iron (II) chloride, iron (II) nitrate, any hydrate thereof, or a mixture thereof. Non-limiting examples of phosphate salts include diammonium phosphate. In some embodiments, an aqueous solution diammonium phosphate is added to an aqueous solution of ferrous sulfate heptahydrate with rapid stirring to prevent the slurry from gelling (Equation IV). In some embodiments, ammonium hydroxide is added to the solution to increase the solution pH to above 4-5, which results in a high yield of vivianite (ferrous phosphate octahydrate). The formed vivianite is a dark blue precipitate and is washed thoroughly to remove any soluble impurities. Non-limiting examples of soluble impurities include $FeSO_4$ or any other soluble sulfate impurities. In some embodiments, gentle aging of the solution at elevated temperatures about 45-65° C. can increase the particle size and enable better filtration and more efficient washing of the residual ammonium sulfate impurities from the ferrous phosphate intermediate product.

$$3Fe(II)SO_4 \cdot 7H_2O + 2(NH_4)_2HPO_4 + 2NH_4OH \rightarrow Fe(II)_3(PO_4)_2 \cdot 8H_2O(s) + 3(NH_4)_2SO_4(aq) \qquad \text{IV}$$

In a second step the blue ferrous phosphate octahydrate is suspended in an aqueous slurry with rapid stirring. An oxidizing agent is then added. Non-limiting examples of oxidizing agents include hydrogen peroxide. In some embodiments, phosphoric acid is added to the slurry along with concentrated hydrogen peroxide or another strong oxidizing agent (Equation V). In some embodiments, the solution temperature can be raised to increase the rate of iron oxidation to the ferric ion which is quickly precipitated by the phosphate in solution. In some embodiments, the oxidation is completed effectively at solution temperatures from 35-65° C. In some embodiments, the solution temperature can be raised to >80° C., or between 85-100° C., to crystallize the desired ferric phosphate dihydrate phase. The iron phosphate precursor synthesized is typically a single phase or mixture of the following isomorphic phases: Metastrengite II, or Metastrengite I, or Strengite. The exact crystalline form depends on the pH of the final aqueous solution during the high-temperature crystallization process. Under the most acidic, pH conditions, pH<1.0 produce essentially pure metastrengite I, also called phosphosiderite in the literature. In the pH range of 1-2 the meta-stable meta-strengite II phase is observed. At higher pH conditions pH>2 produce strengite as the predominant crystalline phase.

$$Fe(II)_3(PO_4)_2 \cdot 8H_2O + H_3PO_4 + 1.5H_2O_2 \rightarrow 3Fe(III)PO_4 \cdot 2H_2O \qquad \text{V}$$

In some embodiments, in the second step, the final product iron phosphate dihydrate is washed again to remove any soluble impurities.

The ferric phosphate produced by the two-step (tow-pot) process described herein (method A) can be used as a precursor for the synthesis of LFP for lithium ion batteries and can meet all of the characteristics as described above.

In some embodiments, the iron phosphate material produced by method A has an iron content of more than about 28.4 wt %, a phosphorus content of more than about 16.0 wt % and a P/Fe ratio of more than 1.00.

In some embodiments, the iron phosphate material produced by method A has a very low level of residual sulfate impurity, typically <700 ppm and as low as 100 ppm as identified by ICP, and sodium levels are comparable to trace or ionized water levels.

In some embodiments, with the appropriate pH control during crystallization in the second step, the iron phosphate material produced by method A has consistently a single crystalline phase, Metastrengite II (analyzed by powder XRD analysis.)

In some embodiments, under other crystallization conditions (higher pH in step 2), iron phosphate can be obtained that is consistently a single crystalline phase, Strengite (analyzed by powder XRD analysis.)

In some embodiments, the iron phosphate material produced by method A is comprised of primary particles in the size range of about 20 to about 100 nm measured by Debye-Shearer analysis (XRD line width). In some embodiments, the primary particles are packed into dense but not sintered aggregates with median population size estimated between about 2 to about 4 um by light scattering measurement. In some embodiments, SEM characterization can also be used and it is revealed that the primary particle size and aggregate particle morphology is uniform. In some embodiments, the size of the agglomerated particle of the ferric phosphate dihydrate material is between about 4 μm to about 10 μm.

In some embodiments, the iron phosphate material produced by method A has a specific surface area in range of about 30 to about 55 m²/g by BET, which confirms the primary particle size and accessible surface area due in the secondary particle aggregate.

In some embodiments, the iron phosphate material produced by method A has an acidic surface, in the pH range of about 2 to about 4 in the case of metastrengite (II) and pH range of about 3 to about 5 in the case of strengite iron phosphate.

In some embodiments, method A further comprises the use of a magnetic trap to remove magnetic impurities. The magnetic trap can be used in the first step or the second step. The Non-limiting examples of magnetic impurities include $Fe_3O_4$, steel, or other iron containing alloys. In certain specific embodiments, the magnetic trap comprises rare-earth magnets. In certain specific embodiments, the magnetic impurity is removed by passing the material through a strong magnetic field gradient.

Two-Pot Ion Phosphate Synthesis Method B

Another two-step (two-pot) method of synthesizing iron phosphate dihydrate is described (method B). In the first step, an aqueous solution of ferrous salt is oxidized with an oxidant in the presence of a soluble phosphate salt to form amorphous iron phosphate (Equation VI). Non-limiting examples of ferrous salt include iron (II) sulfate, iron (II) chloride, iron (II) nitrate, any hydrate thereof, or a mixture thereof. Non-limiting examples of phosphate salt include diammonium phosphate. Non-limiting examples of oxidants include hydrogen peroxide. Method B differs from method A in that the oxidation of ferrous ion to ferric occurs in the first step. In some embodiments, the oxidation occurs at a relatively low temperature about 65° C. or less. After the oxidation, a yellow to off-white amorphous iron phosphate is precipitated. In some embodiments, the amorphous iron phosphate crude material collected by filtration of the first step is comprised of very small particles, about 10 nm particles, that contain very high fraction of water (about 30 wt % if air dried at room temperature). In some embodiments, this amorphous yellow cake is dried to a pale brown or slightly orange material that has a $H_2O$:Fe:Phosphate mole ratio of 3-5:1:1 depending on the exact drying conditions. The crude iron phosphate material from step 1 of method B is then washed to remove any residue soluble impurities. Non-limiting examples of soluble impurities include $FeSO_4$ or $(NH_4)_2SO_4$ or any other soluble sulfate impurities.

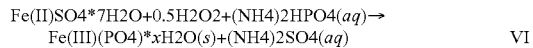

$$Fe(II)SO4*7H2O+0.5H2O2+(NH4)2HPO4(aq) \rightarrow Fe(III)(PO4)*xH2O(s)+(NH4)2SO4(aq) \qquad VI$$

In the second step of method B, the amorphous ferric phosphate is crystallized to form crystalline iron phosphate dihydrate (Equation VII). In some embodiments, the amorphous ferric phosphate is suspended in an aqueous phosphoric acid solution with high rate mixing and the solution pH is adjusted to the range of less than about 1 for meta strengite-I, to the range of about 1 to about 2 for metastrengite II, or to the range of about 2 to about 3 for strengite. In some embodiments, the slurry is heated to a temperature greater than about 80° C., or between about 85 to about 100° C. to crystallize the desired ferric phosphate dihydrate material. Rapid stirring with high shear can prevent the flocculation of a high solids content slurry and very large aggregate particle formation. Conversely slow or controlled addition rate of the slurry to a preheated solution can increase particle growth rate (a suppress nucleation of new aggregates) to increase the aggregate particle size. By controlling the slurry addition rate, the slurry heating ramp rate and the shear mixing rate a precise control over aggregate particle size and tap density can be achieved.

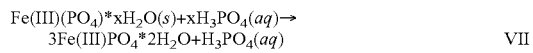

$$Fe(III)(PO4)*xH2O(s)+xH3PO4(aq) \rightarrow 3Fe(III)PO4*2H2O+H3PO4(aq) \qquad VII$$

In some embodiments, method A further comprises the use of a magnetic trap to remove magnetic impurities. The magnetic trap can be used in the first step or the second step. The Non-limiting examples of magnetic impurities include iron oxide such as $Fe_3O_4$, steel, or other iron containing alloys. In certain specific embodiments, the magnetic trap comprises rare-earth magnets. In certain specific embodiments, the magnetic impurity is removed by passing the material through a strong magnetic field gradient.

In some embodiments, in the second step, the final product iron phosphate dihydrate is washed again to remove any soluble impurities.

One of the advantages of the iron phosphate synthesis process described herein (method A and method B) is the two-pot process. Precipitation from an aqueous iron solution occurs in a separate step from the crystallization (or high-temperature aging) step. Thus, two washes occur in each method, first in the precipitation (in the first step of method A or method B) and second after crystallization (in the second step of method A or method B), therefore reducing the undesired sulfate (or anion) impurities to very low levels. Another advantage of ferric phosphate synthesis method described here is that the process starts as an aqueous solution so that insoluble impurities containing iron can be removed by filtration or magnetic trap using rare-earth magnets. Specifically, in method A or method B described herein, ferrous sulfate (or variations with ferric nitrate or ferric chloride) can be passed through 100 nm cartridge filters and/or passed through a rare-earth magnetic. Insoluble (or sparingly soluble) impurities like iron oxide (e.g., $Fe_3O_4$) or steel or other iron containing alloys are effectively captured by passing through a strong magnetic field gradient. The resulting ferric phosphate powder is more desirable for battery applications since the iron oxide and steel particles can be unstable in the battery environment.

The crystalline ferric phosphate dihydrate material synthesized by method A or method B has desirable properties for the use as a precursor to synthesize LFP for lithium ion batteries. The crystalline ferric phosphate dihydrate material synthesized by method A or method B comprises about 28.3 wt % to about 29.6 wt % iron; about 16.0 wt % to about 16.9 wt % phosphorous; and less than about 0.5 wt % sulfate ion. The molar ratio of phosphorous to iron of the crystalline ferric phosphate dihydrate material synthesized by method A or method B is from about 1.001 to about 1.05. Such ferric phosphate dihydrate material has a surface area of from about 30 m²/g to about 50 m²/g, and is substantially free of metallic or magnetic impurities.

In yet another aspect, a method for the synthesis of iron phosphate precursor for production of LFP doped olivine for lithium ion battery cathode material is described. In this respect, an iron compound is added to an aqueous solution of phosphoric acid. The solution pH and temperature are controlled to ensure the complete dissolution of the iron compound. The desired iron phosphate crystalline material can be obtained with high purity and high crystalline phase purity. During the reaction process or after the formation of the final product, one or more metallic traps is used to remove iron, metallic, magnetic impurities. Exemplary iron compounds include, but are not limited to, iron (II) oxide, iron (III) oxide, iron hydroxide, iron oxy-hydroxide, and iron carbonate. Exemplary iron compounds can also include and any mixture of two or more iron compounds described herein. In some embodiments, the iron starting material is in a lower oxidation state, i.e., Fe(II), or a mixed oxidation as in $Fe_3O_4$. If the lower oxidation state of iron is present in the iron starting material, an oxidizing agent is used.

A method for the production of ferric phosphate with ultra-low levels of iron containing impurity is described herein starting from inexpensive iron oxide, iron hydroxide, iron oxy-hydrates, or iron carbonates. In some embodiments, the iron oxide and other iron-containing starting materials are either completely consumed in the reaction or effectively removed to <100 ppm level from the final ferric phosphate product. The highly-pure ferric phosphate produced by this method is suitable for manufacturing of lithium-containing materials for lithium ion batteries.

The phosphoric acid or mixture of phosphoric and phosphate salt can be introduced as an aqueous solution. The phosphoric and phosphate salt can be diluted with water in a 1:1 up to 1:10 volume ratio. The iron oxide, iron hydroxide, or iron oxy-hydrate or iron carbonate is then mixed into the phosphate/phosphoric acid solution resulting in a turbid slurry. The temperature can be raised to facilitate the dissolution of the iron oxy compound by the acidic phosphoric aqueous solution. Due to its low solubility, ferric phosphate precipitates from the solution as amorphous ferric phosphate hydrate.

In some embodiments, the phosphoric acid solution is very concentrated. In some embodiments, the volume dilution of water:phosphoric acid is between about 1:1 to about 4:1. The high acidity of the phosphoric solution may enable complete or nearly complete dissolution of the starting iron oxide (or hydroxide or carbonate) material at or near room temperature. It is thought that the use of concentrated and highly acidic phosphorous acid solutions help to ensure the complete dissolution of iron compound starting material, thus substantially removing all the starting material-based iron magnetic impurities in the final product, i.e., iron phosphate. In other embodiments, a complete dissolution of the iron starting material is obtained when the starting material is in the form of a wet cake of amorphous iron oxy-hydrate that has not been sintered, heat treated, or dried. For example, a fine amorphous particulate cake of iron (as oxy/hydroxyl hydrate) is easily recovered from a clear iron sulfate solution (could be Fe(II), Fe(III), or a mixture thereof) by increasing the pH>5, or pH>7. The fine colloidal iron hydroxide suspension can be recovered by press filtration or centrifuge and the resulting cake (with or without drying) is suitable as the iron material for the synthesis of ferric phosphate as described herein. In these embodiment, the iron compound is a finely dispersed colloidal suspension in a very strongly acidic phosphoric acid solution which facilitates the conversion of the iron oxide to free iron, resulting in a nearly clear solution. In some embodiments, the solution is gently heated to temperatures less than about 95° C., which results in a clear solution or solution with low turbidity. When the solid particulate content of the solution is at a minimum, the implementation of the magnetic screening trap is found to be most effective.

During the addition of the iron starting material to the aqueous phosphate solution, the temperature and pH of the solution is controlled to facilitate and ensure the completion of the reaction. The pH of the solution remains low to speed up the complete dissolution of the iron oxide/hydroxide/carbonate raw material. In some embodiments, the pH of the solution is less than 2. In some embodiments, the pH of the solution is less than 1. In some embodiments, the temperature of the turbid mixture is controlled to be between about 35° C. and about 105° C. In some embodiments, the temperature of the turbid mixture is controlled to be between about 55° C. and about 75° C. Without being bound to a specific theory or more of operation, it is thought that warm temperature facilitates the complete dissolution of the iron starting material. However, excessively high temperatures will facilitate the growth of very large crystalline phases of ferric phosphate, which can encapsulate and trap iron oxide as a contaminant.

In some embodiments, the iron starting material is ferric, i.e., in the oxidation state of Fe(III). In some embodiments, the iron starting material is in a lower oxidation state, i.e., Fe(II), or a mixed oxidation as in $Fe_3O_4$. If the lower oxidation state of iron is present in the iron starting material, an oxidizing agent, e.g., hydrogen peroxide, dissolved air or oxygen, or other mild oxidant, can be added to the turbid mixture to oxidize Fe(II) to Fe(III) in the reaction process. The solubility product of ferrous, Fe(II), phosphate is higher than the ferric phosphate in aqueous solution, so the Fe(III) cation will preferentially complex with free phosphate anion in the turbid solution, forming the amorphous ferric phosphate hydrate suspension. All the ferrous iron, Fe(II), needs to be oxidized to Fe(III) to ensure a complete utilization of the iron material and the correct stoichiometry (P/Fe mole ratio) of the final product.

After the dissolution of the iron starting material and the oxidation of Fe(II) to Fe(III), the free ferric cation complexes with phosphate to result in a pale yellow turbid solution. The temperature of the turbid solution then is raised to initiate the crystallization of ferric phosphate dihydrate, either in the phase form of meta-strengite-I, meta-strengite-II, strengite, or a mixture thereof. In some embodiments, the temperature of the turbid solution is raised to greater than 65° C. When the pH and the slurry temperature of the turbid solution is controlled to be uniform throughout the solution, the crystalline phase of the resulting ferric phosphate can be controlled. In these embodiments, ferric phosphate with a pure or nearly pure crystalline phase can be obtained.

In some embodiments, the temperature of the turbid solution is raised to greater than 70° C. to accelerate crystallization process. In some embodiments, the temperature of the turbid solution is raised to greater than 75° C. to accelerate crystallization process. In some embodiments, the reaction temperature is kept below about 95° C. and the meta-strengite phase of ferric phosphate is favored. In some embodiments, the reaction temperature is kept below about 85° C. and the meta-strengite phase of ferric phosphate is favored. In some other embodiments, the reaction temperature is kept above about 95° C. and the more stable strengite phase of ferric phosphate is observed.

In some embodiments, the solution's pH is less than about 1.0 and pure meta-strengite-II ferric phosphate is produced. In other embodiments, the solution's pH is in the range of about 1 to about 2 and ferric phosphate with the meta-stable meta-strengite I phase is produced. In yet other embodiments, the solution's pH is more than about 2 and strengite is observed as the predominant crystalline phase of ferric phosphate. In some embodiments, the temperature of the solution is controlled to be below 85° C. and the pH of the solution is maintained at or below 1. In these embodiments, a very pure single crystalline phase of meta-strengite-II ferric phosphate is obtained. In other embodiments, the temperature of the solution is controlled to be below 85° C. and the pH of the solution is maintained in the range between about 1 and about 2. In these embodiments, a very pure single crystalline phase of meta-strengite-I is obtained. In yet other embodiments, the reaction temperature is in the range of about 85 to about 105° C., and a mixture of meta-strengite and strengite can results.

Figure 12:
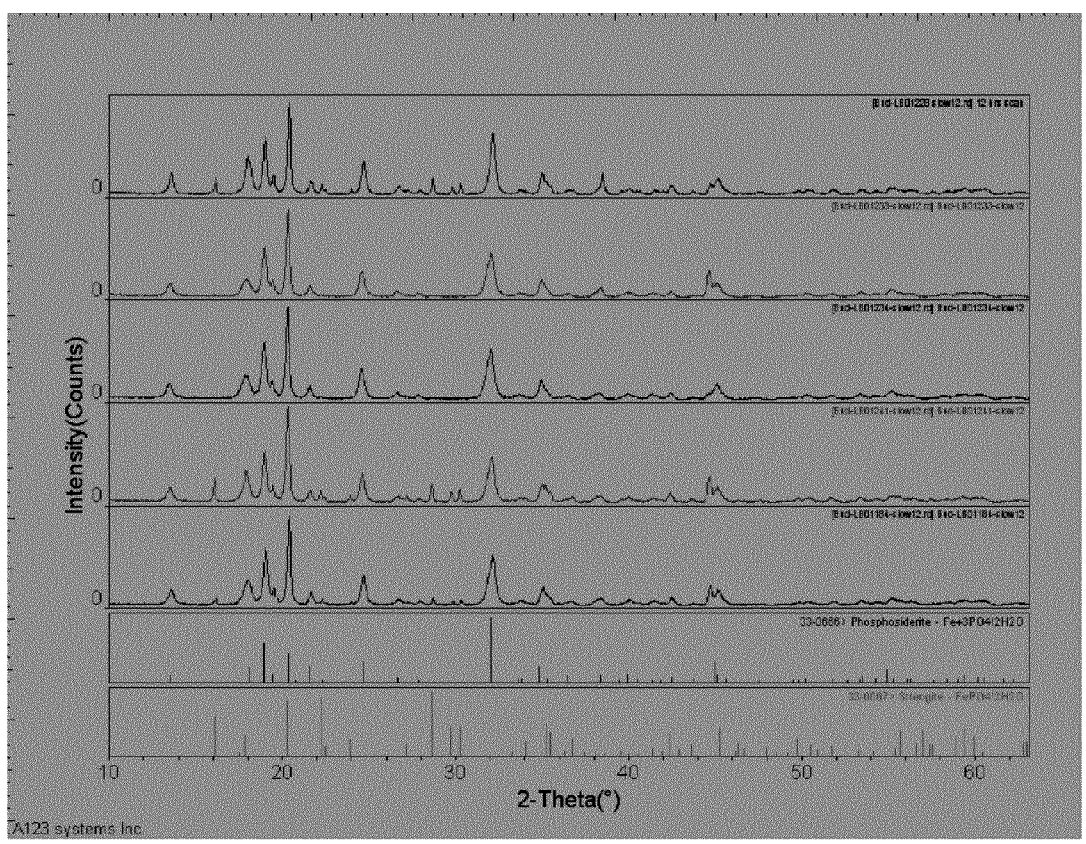
FIG. 12 is a powder X-ray diffraction patterns of five ferric phosphate (E53-91) lots purchased from Chemische Fabrik Budenheim.

FIG. 12 is an illustration of powder X-ray diffraction patterns of five ferric phosphate (E53-91) lots purchased from a commercial source. The standard patterns are of two crystalline phases, phosphosiderite and strengite, as indicated in the lower portion of the Figure. Comparison of the x-ray diffraction patterns to the standards establishes that different commercial lots of iron(II) phosphate contain different proportions of these two phases (and possibly other components). As shown in FIG. 12, the variation in the crystalline phases detected in the ferric phosphate product may indicate either the temperature and/or pH of the reaction solution for the commercial process used to produce the product are not controlled as described herein, which may contribute to the batch to batch variation in the commercial product.

An aspect to the improved synthesis process described here is that any detectable amounts of unreacted iron starting material is completely removed from the ferric phosphate final product. In some embodiments, two protocols are implemented to ensure the high purity of ferric phosphate produced, which is suitable for use for battery electrode materials. First, a highly efficient means of mixing and agitating the solution during the acidic digestion of the iron starting material is utilized. Exemplary efficient mixing means include, but are not limited to, a mechanical high-shear mixing device, such as those employed for dispersions of inks and other compound mixtures. Second, a very efficient means of screening and removing very fine contaminant particles is utilized. Exemplary efficient means of removing contaminant include, but are not limited to, a magnetic field trap. In some embodiments, a circulation loop is used where the crude ferric phosphate solution is pumped through a series of high strength magnetic flux traps external to the high shear mixing tank. The iron oxide or iron hydroxide particles remaining in the ferric phosphate solution are attracted to the magnetic poles as they move through the strong magnetic field gradient adjacent to the bar magnet. The iron oxide (hydroxide) has a higher ferromagnetic moment than the amorphous iron phosphate product, which allows for an effective means of separating the minor contaminant by magnetic field trap. In some embodiments, fluid flow of the ferric phosphate solution is confined to within a few millimeters (<1 cm) of the bar magnetic by the body of the trap. In some embodiments, the rate of fluid flowing past the magnetic trap is optimized so that rapid laminar forces of the fluid flowing over the magnet do not pull the contaminant off the magnet pole and back into the solution. In other embodiments, non-magnetic contaminants are removed in this step as well.

In some embodiments, the concentrated solution of soluble iron in phosphoric acid is further diluted or pH is increased by the addition of a base, for example ammonium hydroxide, to fully precipitate the desired ferric phosphate phase. In these embodiments, the solution temperature and final solution pH (through dilution or addition of base) is carefully controlled to obtain ferric phosphate with desired crystalline phase. In some embodiments, ferric phosphate with desired crystalline phase is isolated when the suspended solid product becomes white, off-white or light pink. After that, the product can be filtered or collected by centrifuge and rinsed to remove excess phosphate and ammonia if used.

Figure 13:
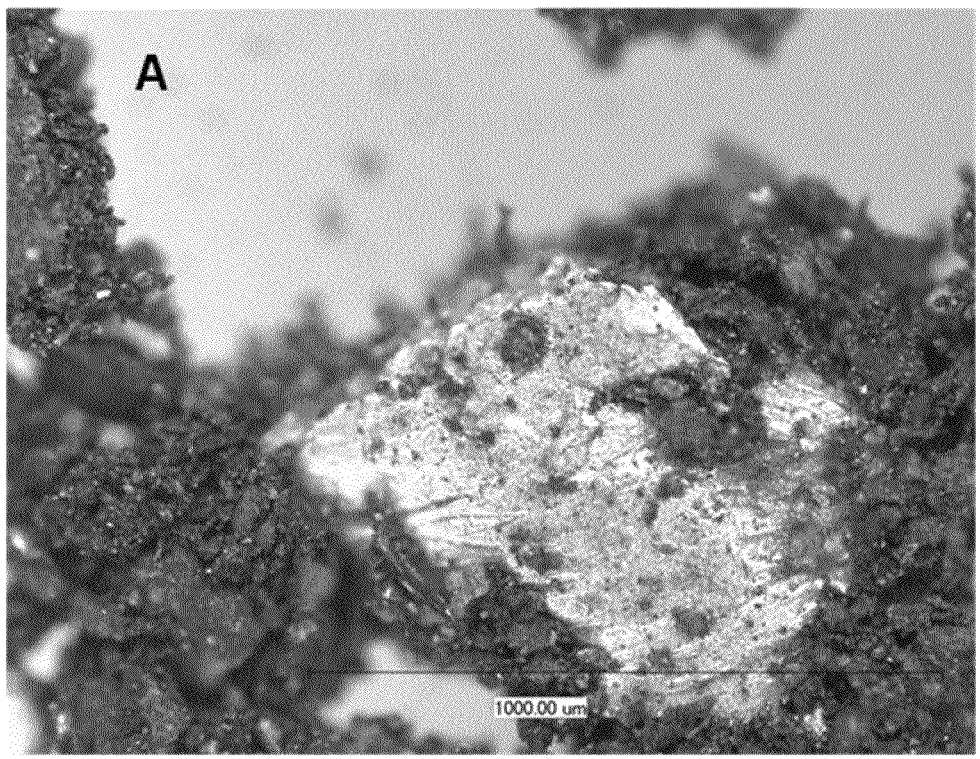
FIG. 13 are microscopic images of the magnetic impurity recovered from wet-milled ferric phosphate.
Figure 13:
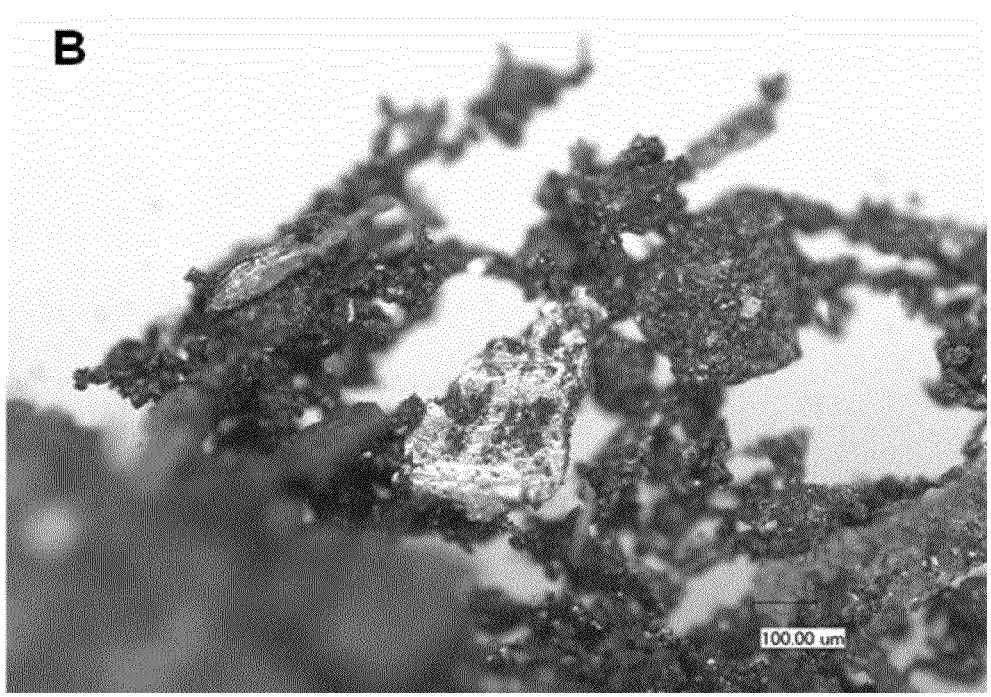

Another aspect of the synthetic method described herein is that the metallic contaminant introduced from metal on metal grinding resulting from the use of equipment in the various process steps of the synthesis are removed or avoided. FIG. 13 is an illustration of microscopic images of the magnetic impurity recovered from wet-milled ferric phosphate. The images in FIG. 13 show shiny and metallic particles, some larger than 20 μm in size, that correspond to steel, most likely stainless steel, as identified as the Fe, Cr, Ni line by XRD. Additional elemental analysis by ICP-AES confirms the chromium and nickel levels in the contaminant are roughly 2:1 (Cr:Ni mole ratio) which is consistent with three hundred series stainless steel. This grade of stainless steel is very commonly used in commercial chemical processing equipment, high speed mixing blades and chemical reactors for example, due to its resistance to chemical corrosion. However, steel and stainless steel are still undesirable contaminants in battery grade chemicals, since these particles are unstable in the lithium-ion battery (just as the iron and iron oxide described above). Also the large "shaved" pieces of steel presumably from equipment wear, are large enough to penetrate the very thin polyolefin separator used in the lithium-ion battery. A metal particle, tens of micron long, can potentially short the anode to cathode if it penetrates the thin polymer separator which kills the battery storage capacity.

Thus, in the synthesis and production of raw material suitable for use in active battery material all sources of equipment metal on metal wear needs to be reduced or eliminated in order to prevent the contamination of the material with iron, steel or stainless steel. As a specific example, the high shear mixer blades or propellers used to disperse the solution during reaction have carbon-steel or stainless steel ball-bearings at the blade shaft. These ball bearings continually wear due to metal on metal grinding, creating micron sized shavings of iron that will contaminant solution and powder product. During the synthetic process described herein, metal surfaces which can come into contact with the chemical solutions or reagents are replaced with ceramic or plastic, where possible.

In some embodiments, the high-shear mixing blade and paddle mixer shafts are coated with plastic and the bearings are made of a high-wear ceramic like rare-earth stabilized zirconium oxide. In some embodiments, the main reactor tank used in the process described herein is ceramic-lined or ceramic-coated. Ceramic coating allows more efficient heat transfer than HDPE, for example, while still eliminating the possibility of metal shavings contaminating the ferric phosphate product. In some embodiments, the filtration unit is plastic, or plastic lined to avoid direct contact of the powder with metal surfaces. In some embodiments, the filtration unit is a press filter or a centrifuge.

In some embodiments, the high wear equipment used in the method described herein is powder-blending and powder-cake milling equipment. After drying the wet-cake recovered from filtration or centrifuging, the iron phosphate material is large hard agglomerate or chunks, not a free flowing powder. The hard agglomerates are broken down into a fine powder with a jet mill, a pulverize mill, a high-speed auger blender, or similar conventional powder crushing equipment. These moving blades all have potential surfaces where metal on metal grinding can occur, and are therefore points of potential metallic contamination for the ferric phosphate powder. In these embodiments, zirconia bearings are used where possible and specially designed plastic or plastic coated blades and plastic or ceramic lined surfaces are used in the mill. Plastic lining can be custom plates of high-density polyolefin (HDPE or HDPP) or polyurethane attached over the metal interior surfaces of the mill or blending equipment.

Thus, as described in one or more embodiments herein, the direct contact between steel (carbon steel, chrome steel, stainless steel or other metal) and the chemical reagents, starting materials, solutions, slurry, wet-cake, or dried powder is avoided in order to reduce or eliminate the contamination of the battery grade ferric phosphate with iron containing metallic particles. In some embodiments, such contact is avoided by coating the steel part with ceramic or replacing the steel part with plastic part.

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and is limited only by the claims which follow.

Experimental Section

The ferric phosphate purchased from Chemische Fabrik Budenheim as article number E53-91, marketed as suitable for battery synthesis, has been evaluated in the production of nanophosphate (doped lithium iron phosphate) by methods described in PCT International Application Number: PCT/US09/31552, filed on Jan. 21, 2009, entitled "Mixed Metal Olivine Electrode Materials For Lithium Ion Batteries," which is incorporated in its entirety by reference herein. And the nanophosphate produced was then evaluated in lithium ion batteries in different battery form factor (cylindrical, prismatic). These evaluation studies demonstrate the need for further improvements in the purity and stability of the ferric phosphate. In particular, the presence of iron oxide or iron contaminant in commercially available iron (III) phosphate illustrates the need for further improvement of the synthesis protocol.

COMPARATIVE EXAMPLES

In conventional method, an aqueous solution of ferric ion is prepared from ferric nitrate, ferric sulfate hydrate or ferric chloride. Or alternatively an aqueous solution of ferrous (II) sulfate can be oxidized with hydrogen peroxide or similar strong oxidizing agent, with the addition of a strong acid, to yield an aqueous ferric solution. Alternatively iron metal powder or metal oxide can be used as the original iron source that is subsequently dissolved with optional gentle heat in concentrated sulfuric, nitric or hydrochloric acid to give a ferrous ion solution.

An aqueous phosphate solution can be prepared from a soluble phosphate salt such as sodium phosphate, lithium phosphate. Alternatively phosphoric acid or monoammonium phosphate or diammonium phosphate can be used but may be neutralized with an appropriate amount of alkaline base (e.g. NaOH, KOH, $NH_4OH$) before use.

The phosphate and ferric solutions are mixed with rapid stirring and homogenization to prevent gelation of the amorphous precipitate. The amorphous ferric phosphate precipitate slurry may be heated to 80° C. or between 85-100° C. to crystallize ferric phosphate dihydrate. By this conventional "one-pot" method the crystalline phase as characterized by powder, x-ray diffraction, XRD, is typically Metastrengite II, or Metastrengite I, or Strengite depending on the pH of the final aqueous solution during the high-temperature crystallization process. The most acidic, pH conditions, pH<1.0 produce essentially pure metastrengite I, also called phosphosiderite in the literature. In the pH range of 1-2 the meta-stable meta-strengite II phase is observed. At higher pH conditions pH>2 produce strengite as the predominant crystalline phase.

Usually, all steps of the synthesis in the conventional method or variations thereof are performed in one-pot. Thus, the resulting products from each step are used directly for the following step without independent purification. Therefore, as a result, the impurities from the previous reaction, such as sulfate, chloride, nitrate, metal, metal oxides and other magnetic materials, are carried over to the next reaction, and into iron phosphate material as the final product. Those impurities, if carried into the LFP materials synthesized from iron phosphate, could result in inferior battery characteristics.

Analysis of the ferric phosphates produced by some variation of the very generally described conventional "one-pot" method typically possess a few undesirable characteristics for a precursor for lithium ion battery cathode production.

For example, when iron sulfate precursor has been used in the conventional method, the resulting ferric phosphate can contain high levels of sulfate, e.g., as high as 3 wt %, identified by ICP, EDS or Ba-precipitation. The undesirable sulfur content of the FP precursor can often be reduced below 1 wt % with additional washing of the crude FP material. However, the extensive washing produces very large quantities of waste water which can add significant cost to the material. Also it is generally not possible to high sulfate materials to cleaner than 1,000 ppm sulfate possibly because the sulfate is occluded or trapped in the bulk of the material during the very rapid precipitation.

Iron phosphate materials with similarly high levels of chloride or nitrate have been found on the commodity market by the conventional method, where the iron salt was either ferric or ferrous chloride, or ferric nitrate.

The majority of the ferric phosphates found in the commodity chemical market contain lower than desired iron (<28.4 wt %) and phosphate (<16.0 wt %) contents. In general this is due to the higher levels of anion impurity ($SO_4$, Cl, $NO_3$) and/or due to higher moisture contents.

Commodity iron phosphate materials typically are less than desired degree of crystallinity, which corresponds to the higher level of moisture content.

Several commodity iron phosphate chemicals had P/Fe ratios of less than one. In some cases P/Fe as low as 0.93 was detected.

Most iron phosphate materials on the commodity market have pH between about 3 and about 6 and contain more than one crystalline phase. In contrast, the iron phosphate material produced according to methods disclosed herein has high crystalline phase purity, consistent iron content, phosphate content, water content, and iron to phosphate ratio.

Iron phosphate samples from various suppliers in America, Asia, and Europe were tested. It was found that many commodity suppliers of ferric phosphate contained unacceptably low levels of iron and/or phosphate. Additionally most ferric phosphates on the commodity market contain unacceptably high levels of sulfate, chloride or nitrate, presumably as anion salts present during precipitation and crystallization.

Iron phosphate samples from Budenheim (catalog number 5381, herein referred to as iron phosphate Sample 1) were used as a reference in the evaluation and testing studies. Many batches of iron phosphate sample from Budenheim was analyzed. There existed a marked variation regarding the iron content, phosphate content, and magnetic impurities. The XRD pattern for one example batch of iron phosphate is show in FIG. 12. As shown in FIG. 12, Sample 1 showed a mixture of two phases.

Sample 1 was checked for metallic and magnetic impurity by preparing liquid slurry of the ferric phosphate and passing through magnet trap and particle filter. Single primary particles as large as 2 um were found and magnetic impurities of maghemitite, magnetite and stainless steel were detected. These metallic impurities are unacceptable since short circuits (between cathode and anode) in the lithium ion-battery make the battery unusable.

Additionally, Sample 1 was observed to contain very large single crystals by high-resolution SEM. Single particles as large as 1 um were detected in most lots. In some embodiments, the battery cathode material should consist of a single crystal size of 30-50 nm, this requires that the most desirable crystallite size for the ferric phosphate starting material may also be of the same size. Otherwise the a lengthy high energy milling step would be required to reduce the primary particle size of the ferric phosphate starting material to <100 nm before reacting to form the doped-olivine cathode material (as previously described in other patents). A representative SEM image of Sample 1 is shown in FIG. 13, which depicts the wide range of particle sizes (crystal sizes from <100 nm to >1 um) observed in the aggregate powder.

The very large primary particle size of Sample 1 is also reflected in the specific surface area measurement. Sample 1 powder analyzed had specific surface area measured from <18 m²/g. This contrasts the ferric phosphate materials synthesized by the processes described here, which are 30-55 m²/g.

Example 1

Two-Pot Synthesis of FePO$_4$-2H$_2$O, Method B

Ferrous sulfate (FeSO$_4$-7H$_2$O, 227 g) was dissolved in 1 L water. Diammonium phosphate ((NH$_4$)$_2$HPO$_4$, 110 g) was dissolved in 0.5 L water. Hydrogen peroxide (51 g, 30 wt %) was added to the ferrous sulfate solution turning dark red. All insoluble material in the staring iron and phosphate materials can be removed from the two solutions by either a fine mesh cartridge filter and/or a rare-earth magnetic trap. Most iron salts, in particular, have trace amounts of insoluble material that can be detrimental to the energy storage application. The phosphate and iron solutions were mixed together with rapid stirring. After 30-60 minutes the ferric phosphate yellow precipitate was filtered. The yellow-orange cake was suspended in 1.5 L water with additional phosphoric acid (58 g; 85%) H$_3$PO$_4$ and solution was raised to reflux (~90-95° C.) for 60-90 minutes. The pink crystalline ferric phosphate dihydrate was filtered, washed and when dried weighed 154 g.

Figure 3:
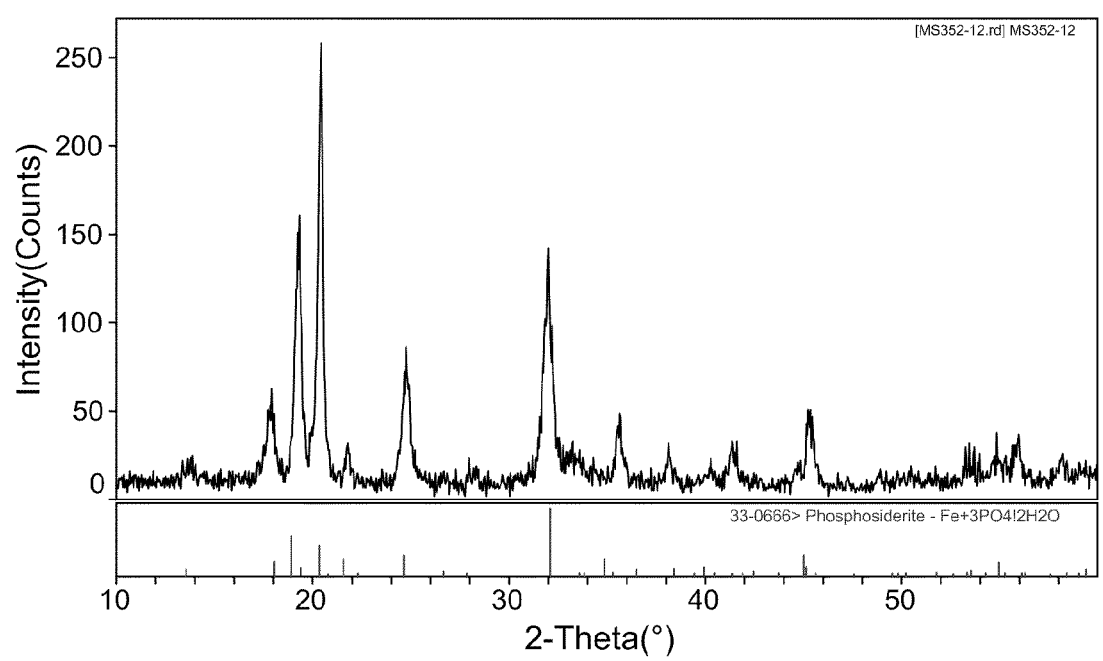
FIG. 3 is a powder X-ray diffraction pattern illustrating the crystal phase and purity of the ferric phosphate according to one or more embodiments.

The material analysis is Fe=28.9 wt %, P=16.6 wt %, SO$_4$<700 ppm and Na<10 ppm by ICP-AES and H$_2$O=19.5-20 wt % by TGA. The very low ppm level of sulfate is desirable for the intended use as a starting material for lithium iron phosphate cathode powder. The sulfate can produce unwanted side-reactions in the battery. XRD shows the material is pure metastrengite-I (or phosphosiderite) as shown in FIG. 3.

Example 2

Two-Pot Synthesis of FePO$_4$-2H$_2$O, Method B

Ferrous sulfate (FeSO$_4$-7H$_2$O, 278 g) was dissolved in 1 L water. Diammonium phosphate ((NH$_4$)$_2$HPO$_4$, 135 g) was dissolved in 0.5 L water with phosphoric acid (11.5 g, 85 wt %) and hydrogen peroxide (70 g, 30 wt %). All insoluble material in the staring iron and phosphate materials can be removed from the two solutions by either a fine mesh cartridge filter and/or a rare-earth magnetic trap. Most iron salts, in particular, have trace amounts of insoluble material that can be detrimental to the energy storage application. The phosphate and iron solutions were mixed together with rapid stirring. After thirty minutes the ferric phosphate yellow precipitate was filtered. The yellow-orange cake was suspended in 1.5 L water with additional phosphoric acid (58 g; 85%) H$_3$PO$_4$ and solution was raised to reflux (~90-95° C.) for 60-90 minutes. The pink crystalline ferric phosphate dihydrate was filtered, washed and when dried weighed 198 g.

Figure 4:
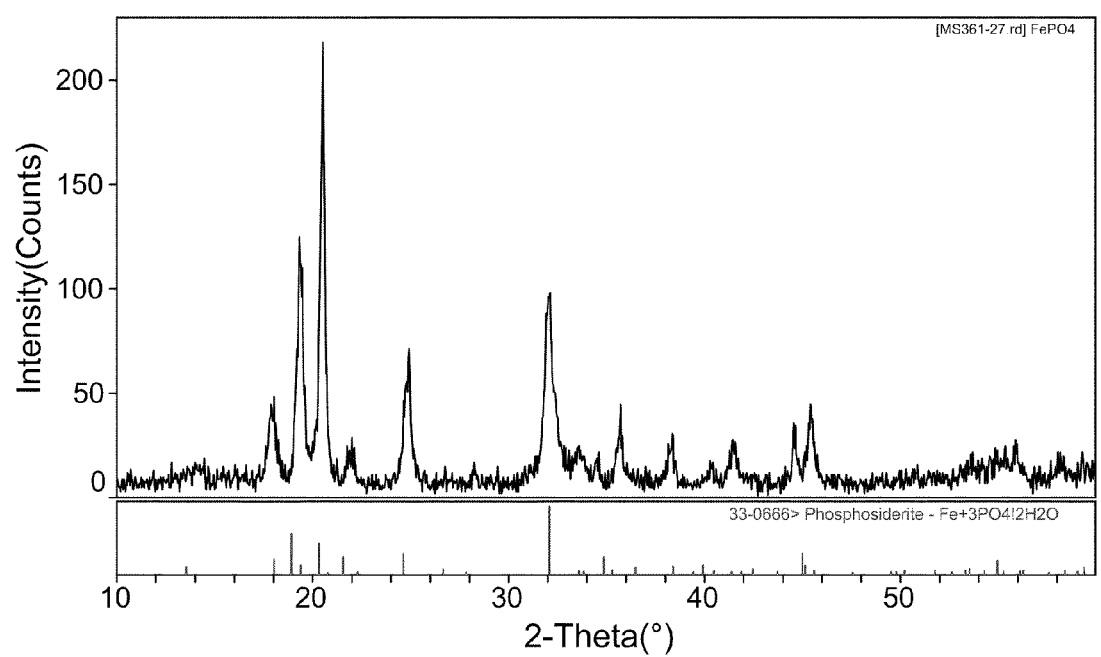
FIG. 4 is a powder X-ray diffraction pattern illustrating the crystal phase and purity of the ferric phosphate according to one or more embodiments.
Figure 5:
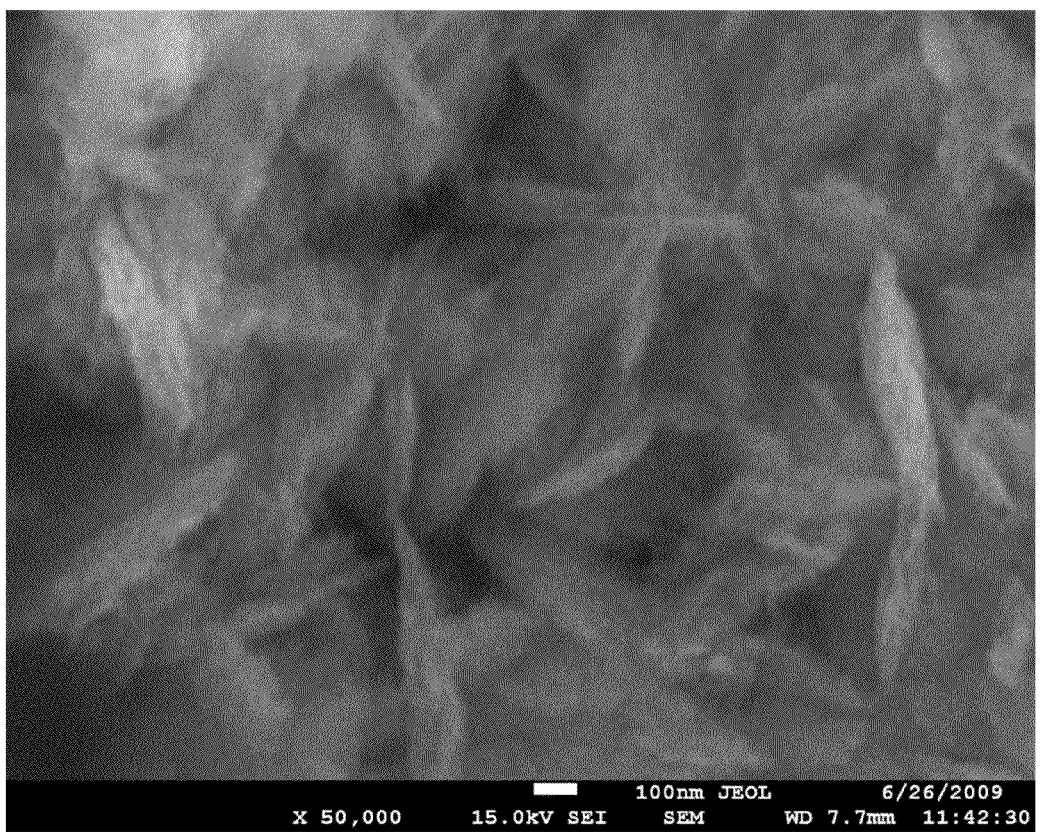
FIG. 5 is a SEM image of the ferric phosphate according to one or more embodiments.

The material analysis is Fe=28.0 wt %, P=16.6 wt %, SO4<300 ppm, Na<30 ppm determined by ICP-AES and H$_2$O=20 wt % by TGA. XRD was metastrengite-I (or phosphosiderite) as seen in FIG. 4. The very small dimensions of the crystals can be seen in the scanning electron micrograph (FIG. 5). The smallest crystallite dimension is on the order of tens of nanometer and is elongated. These elongated crystallites are aligned with long-axes parallel to form larger aggregates hundreds of nm long. These aggregates are then clumped together in random agglomerates of 1-5 um average diameter.

Example 3

Two-Pot Synthesis of FePO$_4$-2H$_2$O, Method A

Ferrous sulfate (FeSO$_4$-7H$_2$O, 200 g) was dissolved in 1.5 L water. Diammonium phosphate ((NH$_4$)$_2$HPO$_4$, 66 g) was dissolved in 0.5 L water with ammonium hydroxide (78 g, 30 wt %). All insoluble material in the staring iron and phosphate materials can be removed from the two solutions by either a fine mesh cartridge filter and/or a rare-earth magnetic trap. Most iron salts, in particular, have trace amounts of insoluble material that can be detrimental to the energy storage application. The phosphate and iron solutions were mixed together with rapid stirring. After thirty minutes the ferrous phosphate blue precipitate was filtered. The blue cake was suspended in 1.5 L water. A solution of hydrogen peroxide (82 g, 30 wt %) and phosphoric acid, H$_3$PO$_4$, (26 g; 85%) in 0.5 L was added slowly to the ferrous phosphate slurry. The temperature was slowly raised to ~95-100° C. for two hours. The pink crystalline ferric phosphate dihydrate was filtered, washed and when dried weighed 97 g.

Figure 6:
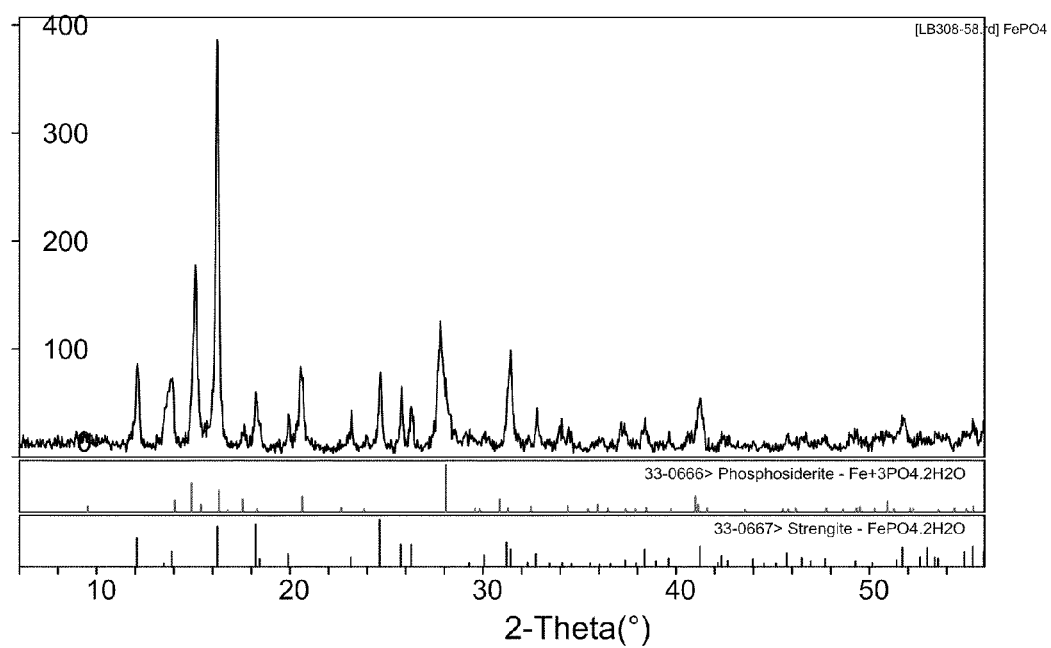
FIG. 6 is a powder X-ray diffraction identification of the crystal phase composition of the ferric phosphate according to one or more embodiments.
Figure 7:
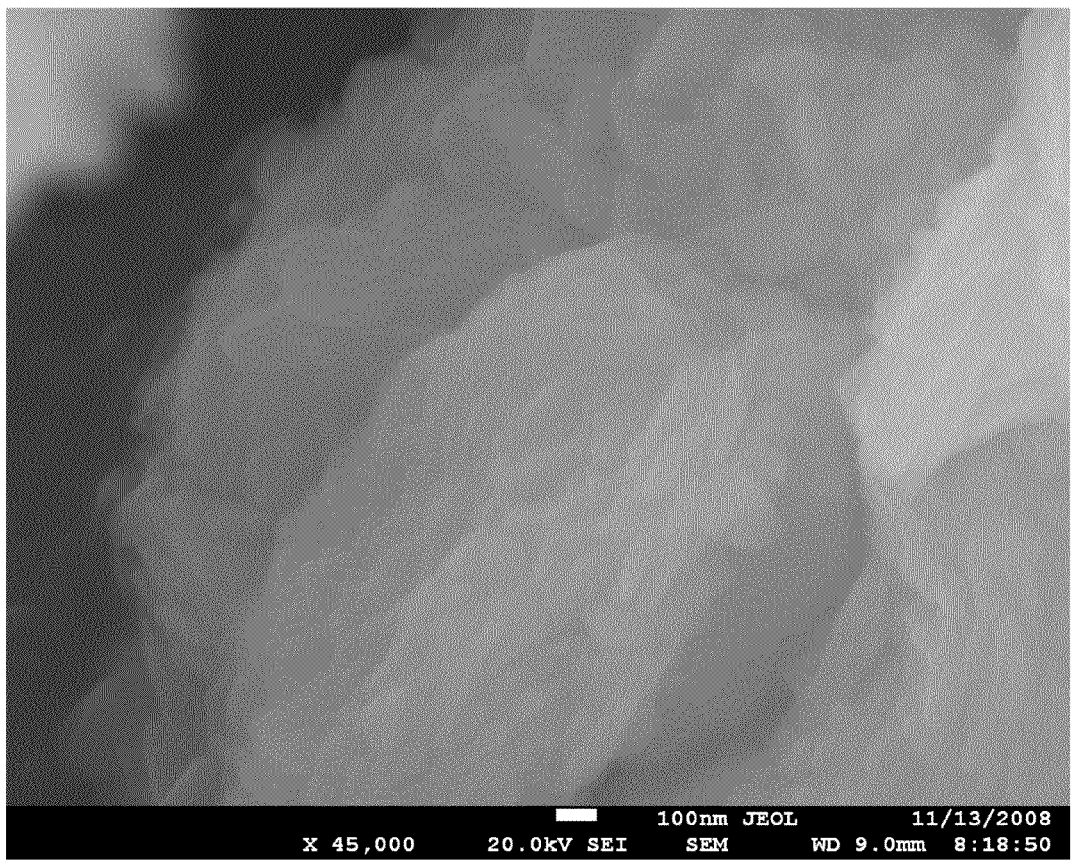
FIG. 7 is a SEM image of the ferric phosphate synthesized by the process according to one or more embodiments.

The material analysis is Fe=28.8 wt %, P=16.0 wt %, Na<20 ppm, SO$_4$<120 ppm by ICP-AES and H$_2$O=20 wt % by TGA. The very low ppm level sulfate impurity is high desirable in the intended use of the material for synthesis of a battery cathode material. XRD was a mixture of metastrengite-I and a minor amount of strengite (shown in FIG. 6). FIG. 7, shows the particle morphology of the ferric phosphate synthesized by this method. The primary (smallest) crystal grains are on the order of 10-100 nm, which is highly desirable for synthesis of lithium iron phosphate cathode materials for high powder applications (described below). These crystal grains are not as elongated as those produced by the synthesis method A (Example 1 and 2). Also the primary crystals are aggregated into more compact spheres than those produced from method A.

Example 4

Two-Pot Synthesis of FePO$_4$-2H$_2$O, Method A Variation

Ferrous sulfate (FeSO$_4$-7H$_2$O, 200 g) was dissolved in 1.0 L water. Trisodium phosphate Na$_3$PO$_4$ (85 g, 99% pure anhydrous) was dissolved in 1.0 L water. All insoluble material in the staring iron and phosphate materials can be removed from the two solutions by either a fine mesh cartridge filter and/or a rare-earth magnetic trap. Most iron salts, in particular, have trace amounts of insoluble material that can be detrimental to the energy storage application. The phosphate and iron solutions were mixed together with rapid stirring. After 60 to 90 minutes the ferrous phosphate blue precipitate was filtered. The blue cake was suspended in 1.5 L water with H$_3$PO$_4$, (26 g; 85 wt %). Hydrogen peroxide (94 g, 30 wt %) was added slowly to the ferrous phosphate slurry. The temperature was slowly raised to ~95-100° C. for two hours. The pink crystalline ferric phosphate dihydrate was filtered, washed and when dried weighed 128 g.

Figure 8:
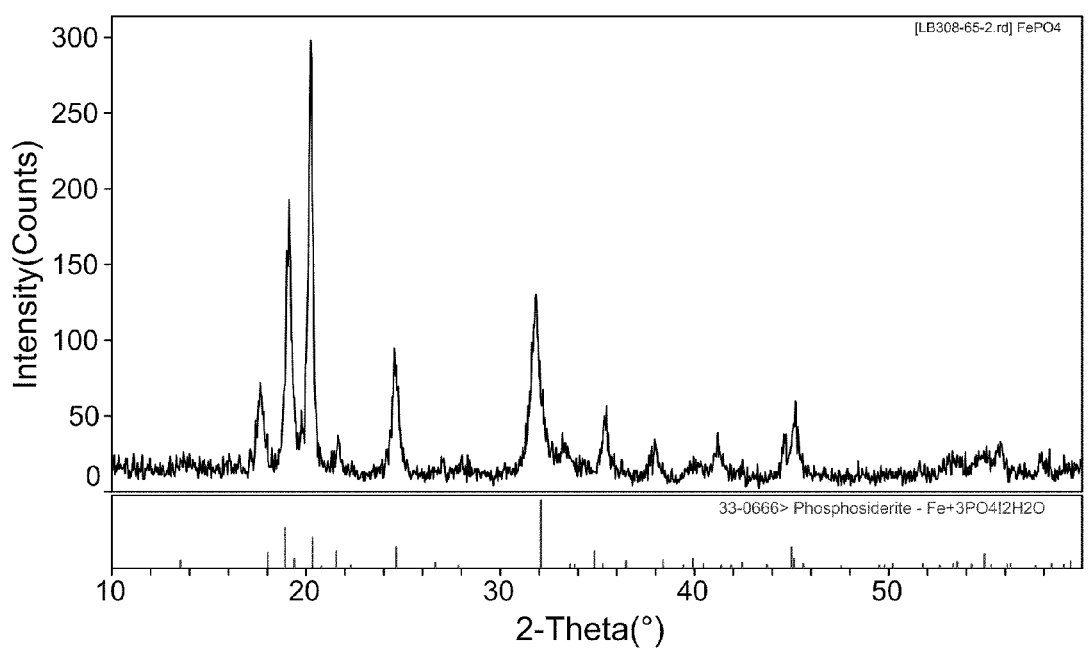
FIG. 8 is a powder X-ray diffraction identification of the crystal phase and purity of the ferric phosphate according to one or more embodiments.

The material analysis is Fe=28.6 wt %, P=16.0 wt %, Na<50 ppm, SO$_4$<500 ppm by ICP-AES and H$_2$O=20 wt % by TGA. XRD was metastrengite-I as shown in FIG. 8.

Example 5

Preparation of a Lithium-Ion Secondary Cell having a Lithium and Phosphorus Rich Positive Electrode A detailed synthesis of the mixed metal olivine electroactive material is described, for example, in U.S. application Ser. No. 12/357,008. The lithium iron phosphate cathode materials were synthesized using the ferric phosphate materials synthesized in Examples 1-4 by the reaction of iron phosphate dihydrate (from Examples 1-4), with lithium carbonate (>99%) and vanadium oxide (>99.9%).

The lithium iron phosphate materials were used to prepare a positive electrode for electrochemical evaluation and testing. The electroactive layer on alumina foil current collector included PVDF-HFP copolymer commercially available as Kynar® 2801 and conductive carbon (Super P). The thick paste is cast on one side of an aluminum foil current collector using a die casting apparatus, dried in an oven to remove the casting solvent and densified using a calendaring apparatus.

The positive electrode and lithium foil as the negative electrode were cut to proper dimensions and interposed with a microporous polyolefin separator Celgard® 2500 (Celgard LLC) to form a Swagelok type half cell against lithium foil. First charge capacities (FCC's) along with capacity were measured at the rates: C/5, C/2, 1C, 2C, 5C, 10C, 20C. The complete discharge of a battery over 1 hour is defined as a discharge rate of 1C (1 hour capacity), similarly a discharge of 10C, would be discharging 10× the batteries capacity in 1 hour or a complete discharge in 1/10 of a hour (6 minutes).

Figure 9:
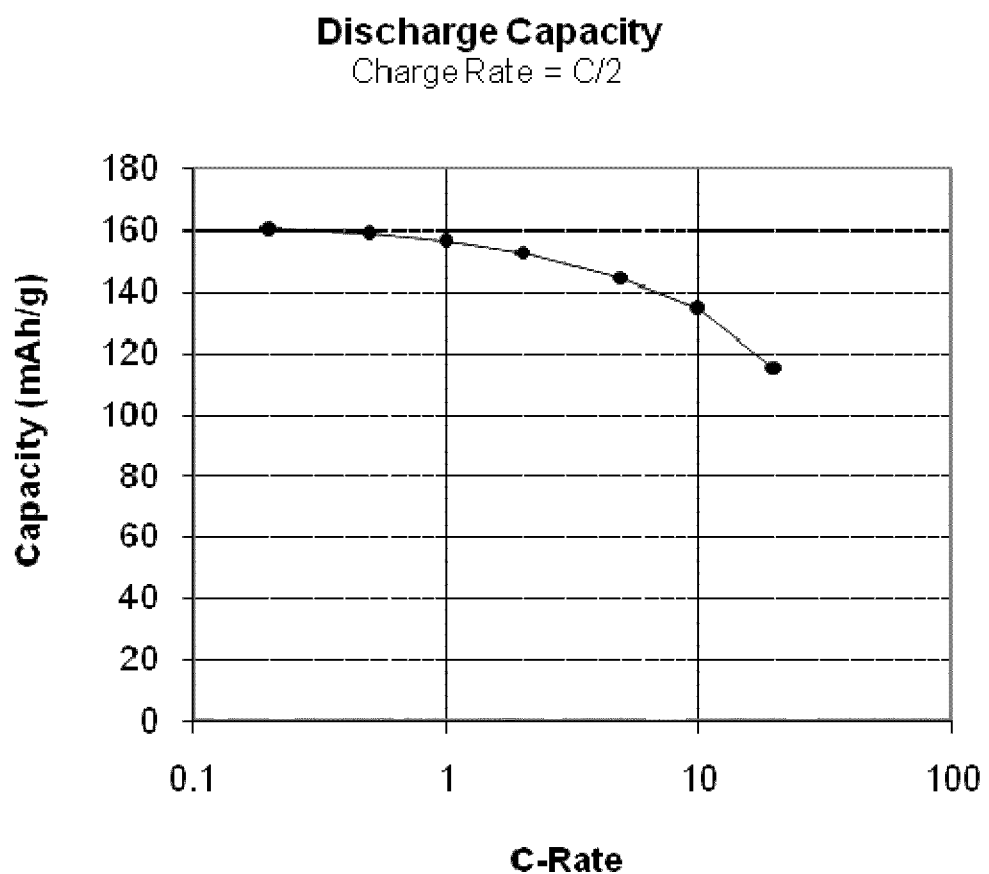
FIG. 9 is a discharge rate map of the cathode powder synthesized using ferric phosphate made by process according to one or more embodiments.

FIG. 9 is a plot of discharge capacity vs. C rate for cells including a positive electrode active material made by the method described in Example 5, and using the ferric phosphate raw material synthesized by the method described in through 4 testing minor variations in reaction temperature, solution pH, reaction or aging time and slurry concentration. Generally, it was observed that the phosphosiderite or metastrengite phases are crystallized around 85° C. with minor variation depending on solution pH. The pH of the solution also has great influence on the crystalline phase or phases resulting from the synthesis as previously described Reale and Scrosati (in *Chemistry of Materials*, 2003, vol. 15). Most materials were characterized for phase purity (by XRD), elemental composition (by ICP-AES) and particle morphology (by high resolution microscopy). Ferric phosphates were selected based on their material properties to be made into doped lithium iron phosphate cathode powder by the process described in example 5 and were evaluated for electrochemical performance. In general, the specific storage capacity of the doped $LiFePO_4$ materials tested was good, achieving 85-95% of the theoretical capacity at C/5 rate. And the capacity retention was still very good at high discharge rates, generally 65-90% at 10C rate.

Example 6

An Analytical Characterization of an as-Purchased Ferric Phosphate Material

Table 1 illustrates an analytical characterization of an as-purchased ferric phosphate material (sold as E53-91, Chemische Fabrik Budenheim).

TABLE 1

Physical characterization of ferric phosphate materials.

| E53-91 | Elemental Analysis | | | | Specific Surface Area | $H_2O$ wt % loss | Particle Size Distribution | | |
|---|---|---|---|---|---|---|---|---|---|
| Lot # | Fe | P | Na | SO4 | $m^2/g$ | @250° C. | D-10 | D-50 | D-90 |
| LB01222 | 29.43 | 16.35 | 0.01 | 0.017 | 23.49 ± 0.03 | 18.95 | 0.62 | 3.98 | 9.47 |
| LB01229 | 29.35 | 16.48 | 0.008 | 0.014 | 22.00 ± 0.03 | 18.89 | 0.57 | 3.31 | 9.22 |
| LB01234 | 28.93 | 16.34 | 0.007 | 0.016 | 27.72 ± 0.06 | 18.93 | 0.63 | 3.52 | 9.88 |
| LB01235 | 28.43 | 15.97 | 0.003 | 0.012 | 25.19 ± 0.03 | 19.09 | 0.62 | 3.65 | 9.65 |

Example 1. The very high specific capacity (mAh/g) of 160 mAh/g is 95% of the theoretical maximum for pure (un-doped) $LiFePO_4$. The high specific storage capacity of this cathode material is retained even at very high discharge rates like 10C (135 mAh/g).

Figure 10:
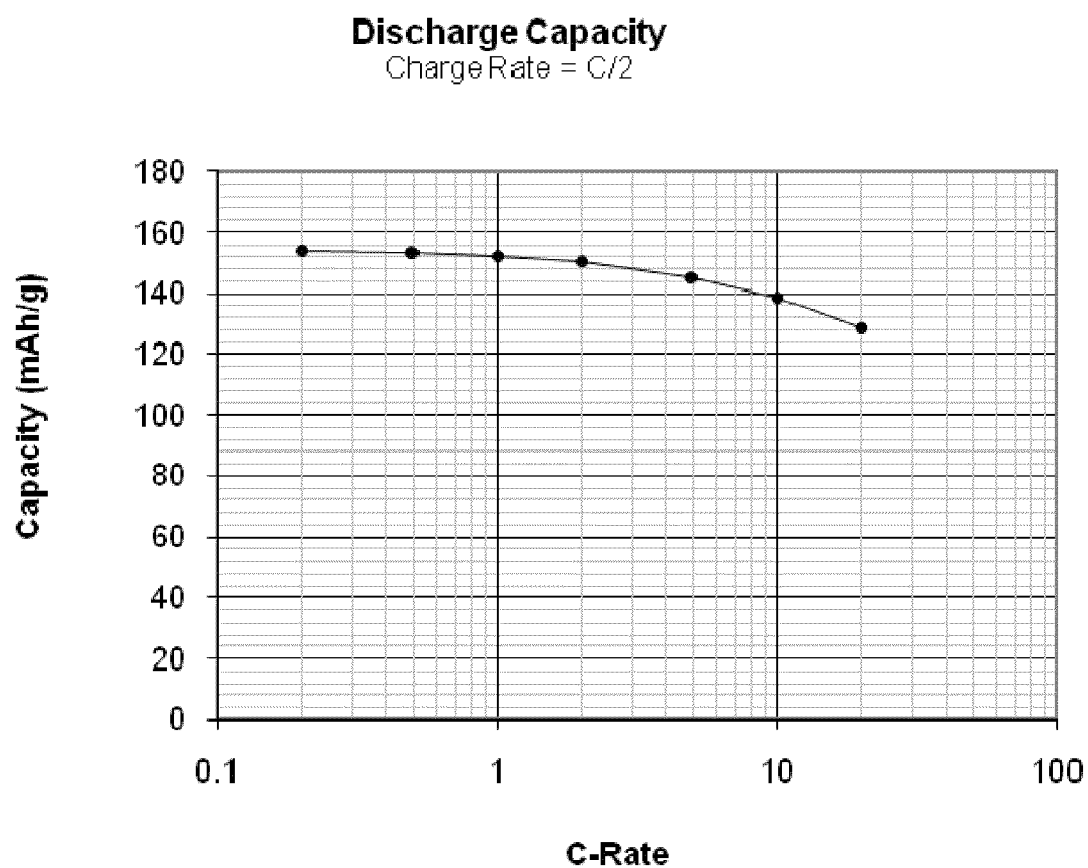
FIG. 10 is a discharge rate map of the cathode powder synthesized using ferric phosphate made by process according to one or more embodiments.
Figure 11:
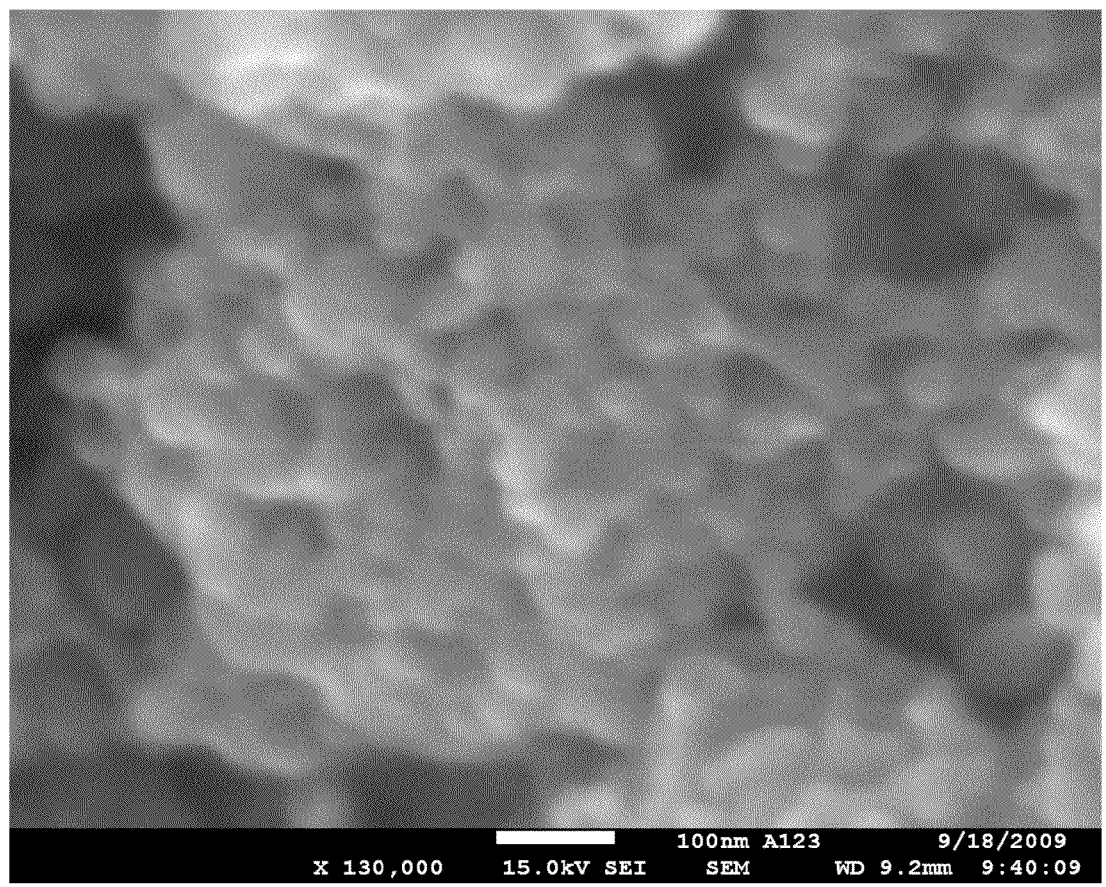
FIG. 11 is a nanoscale dimension and uniform particle morphology of the doped lithium iron phosphate made from the ferric phosphate according to one or more embodiments.

The rate map is also shown for the doped lithium iron phosphate cathode powder made using the ferric phosphate raw material synthesized by the process described in Example 2. Shown in FIG. 10, the cathode powder performance is very good at high discharge rate. This lithium cell achieved 90% retention of the low-rate specific capacity at a six minute discharge (10C). Thus, optimization of the ferric phosphate synthesis conditions can result in very fine control of the particle morphology and primary particle size of the starting material ferric phosphate, which in turn results in a very high power cathode powder for lithium-ion battery applications. In this case the very small ferric phosphate particles produced by Example 2 (see FIG. 5) enabled the synthesis of doped lithium iron phosphate with very high power performance. The nanoscale dimension and uniform particle morphology of the doped lithium iron phosphate made from the ferric phosphate described in Example 2 is shown in FIG. 11.

Roughly one hundred ferric phosphate materials were prepared by the synthetic processes described in Examples 1

In FIG. 12, the powder x-ray diffraction patterns from five representative ferric phosphate lots from Chemische Fabrik Budenheim are shown. The primary crystalline form of the ferric phosphate product (approximately 90-100% of the product) is Meta-strengite-II, according to the assignment by Reale and Scrosati (*Chem. Materials*, 2003, 15, 5051). In three of the lots there is a minor (up to ~10%) minor phase identified as Srengite, the more thermodynamically stable crystal phase. It is interesting that even a high resolution scan does not indicate the presence of an iron or iron oxide impurity phase.

Figure 14:
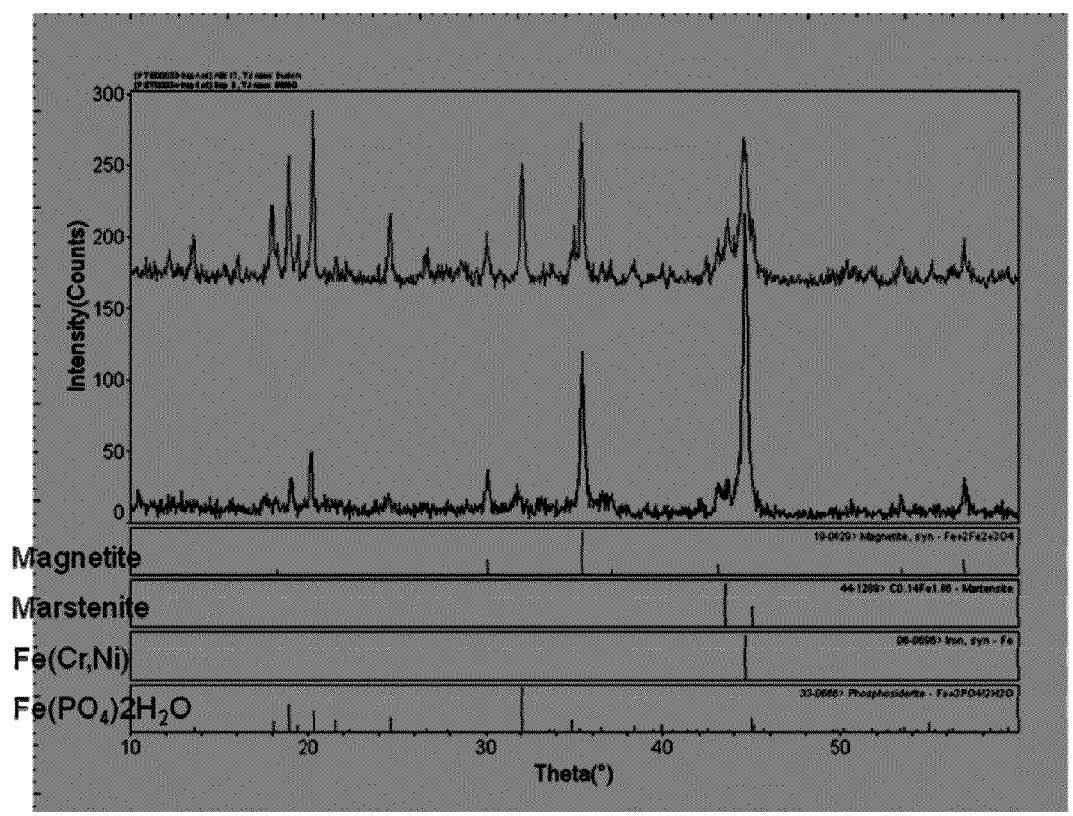
FIG. 14 is a X-ray diffraction identification of the magnetic contaminants collected from wet-milled ferric phosphate.

The commercial ferric phosphate was suspended in a solvent to make a wet slurry that was then passed through a strong raw-earth magnetic filter (trap). The magnetic impurity collected from the wet-milled slurry containing ferric phosphate has been analyzed. Optical microscope images of the magnetic impurity that was recovered from the wet-milled slurry with ferric phosphate are shown in FIG. 13. Shiny metallic particles, from 10-100 µm in size are apparent as well as a grey-black powder. The X-ray diffraction analysis identifies at least three contaminant phases as well as a trace of residual ferric phosphate (that sample that was not rinsed sufficiently, see FIG. 14). Marstentite, or carbon-steel, as well as stainless steel (Fe, Cr, and Ni) were identified in the x-ray analysis. The primary contaminant is iron oxide, as either magnetite and maghemite ($Fe_3O_4$), which was evident in the microscopic images as the fine black powder.

Figure 15:
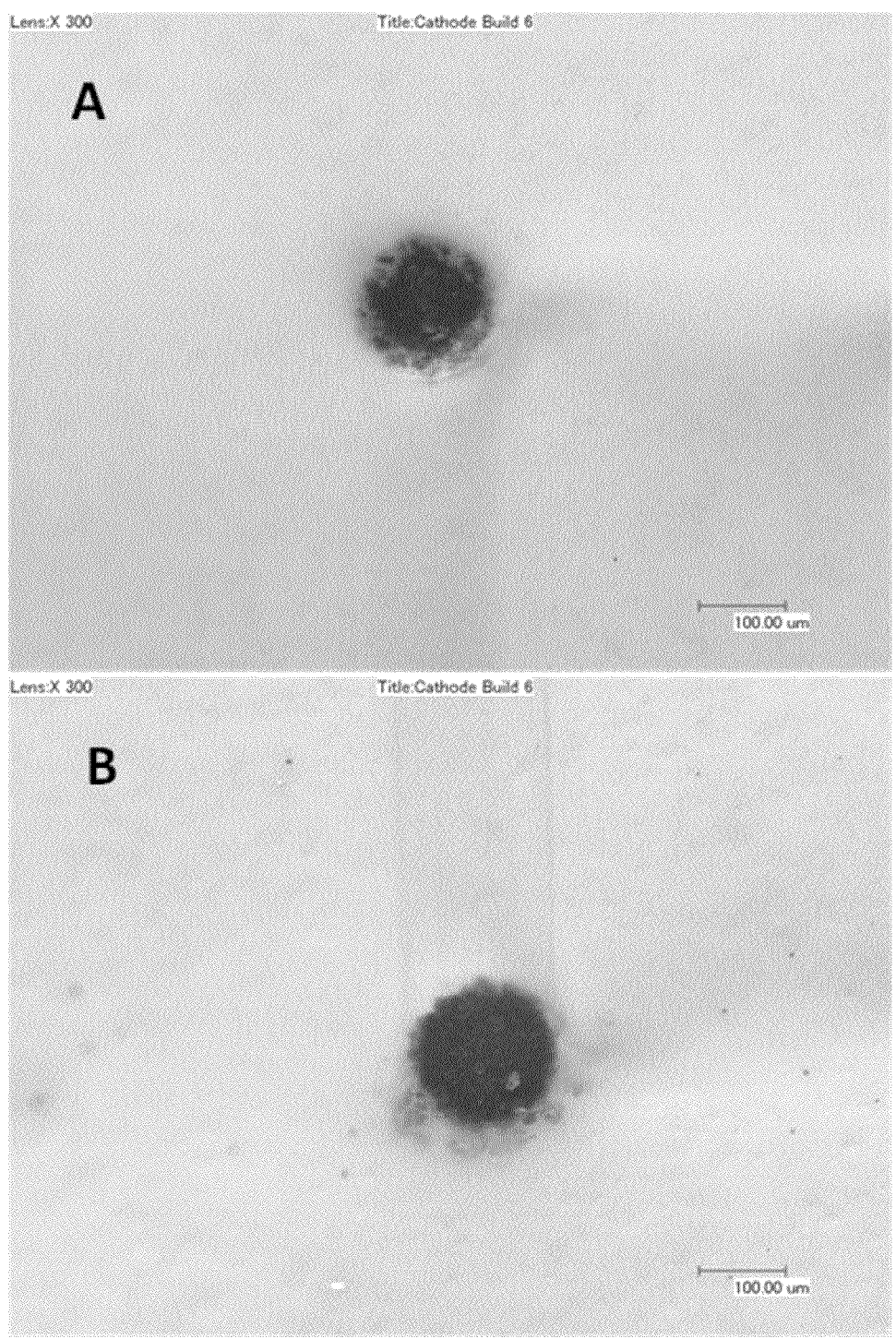

The commercial grade ferric phosphate from Chemische Fabrik Budenheim was use to synthesize nanophosphate (doped lithium iron phosphate) by method described in PCT International Application Number: PCT/US09/31552, filed on Jan. 21, 2009, entitled "Mixed Metal Olivine Electrode Materials For Lithium Ion Batteries," which is incorporated in its entirety by reference herein. Lithium ion batteries comprised of a cathode of lithium iron phosphate, nanophosphate, (on aluminum current collector) and a hard-carbon anode (on copper current collector) with a polyolefin separator were assembled to test the performance of the cathode material made using the ferric phosphate made by the method described above. The lithium ion cells were filled with typical electrolyte (organo-carbonate solvent with $LiPF_6$) and activated to a positive voltage of 3.8V (with respect to lithium metal). After measuring the reversible energy stored in the cell the battery was recharged and subsequently stored at the cell's open circuit voltage of nominally 3.35V for a period of 2 weeks at ca 40° C. In FIG. 15, two pictures are shown of tiny black spots that were found on the white polyolefin separator in cells that have not passed the self discharge storage test. The spot shown in FIG. 15, is of both faces of the separator (one side facing the cathode and the other facing the anode), which reveals that this spot has completely penetrated the separator. Chemical analysis of the black region by electron-dispersion spectroscopy (EDAX) under a low-magnification electron beam in a scanning electron microscope, identifies the black region as pure metallic iron. On higher magnification the iron can be resolved as dendritic filaments that are interconnected through the pore space in the polyolefin film. Other black spots of similar size and appearance (not shown) were found to contain iron, chromium and trace level of nickel, which indicates the source of this dendrite was possibly a stainless steel particle.

It is presumed that these dendritic iron filaments can form a weakly conductive pathway for slow leakage current to be passed between anode and cathode as the mechanism of the battery's loss of electrochemical storage capacity through self discharge.

What is claimed is:

1. A method of synthesizing crystalline ferric phosphate material, comprising:
    a) introducing an iron (II) salt and a phosphate salt and ammonium hydroxide into an aqueous solution to form a ferrous phosphate material;
    b) collecting and washing the ferrous phosphate material to remove impurities; and
    c) after washing the ferrous phosphate, oxidizing the ferrous phosphate from step b) with an oxidizing agent to form a crystalline ferric phosphate material comprising a molar ratio of phosphorus to iron is from about 1.001 to about 1.05;
    wherein step c) further comprises heating ferrous phosphate at a temperature of between about 35 to about 65° C.; and
    wherein the crystalline ferric phosphate material comprises less than 100 ppm metallic or magnetic impurities and less than 700 ppm sulfate impurities.

2. The method of claim 1, wherein the ferric phosphate material comprises ferric phosphate dihydrate.

3. The method of claim 1, wherein the ferrous phosphate material compromises ferrous phosphate octahydrate.

4. The method of claim 1, further comprises: using one or more metallic traps to remove metallic or magnetic impurities in step a), step b), step c), after step c), or any combination thereof.

5. The method of claim 4, wherein the magnetic trap comprises rare-earth magnets.

6. The method of claim 1, wherein the iron (II) salt is step a) comprises iron (II) sulfate, iron (II) chloride, iron (II) nitrate, any hydrate thereof, or a mixture thereof.

7. The method of claim 1, wherein the phosphate salt in step a) comprises diammonium phosphate.

8. The method of claim 1, wherein the pH of the resulting solution in step a) is between about 4 to about 5.

9. The method of claim 1, wherein the oxidizing agent comprises hydrogen peroxide.

10. The method of claim 1, wherein step c) further comprises adding phosphoric acid.

11. The method of claim 1, wherein the method further comprises:
    heating the ferrous phosphate at a temperature of between about 85 to about 100° C.

12. The method of claim 2, wherein the method further comprises washing the resulting crystalline ferric phosphate dihydrate to a purity level of about 95% to about 99%.

13. The method of claim 2, wherein the synthesized crystalline ferric phosphate dihydrate material comprises:
    from about 28.3 wt % to about 29.6 wt % iron;
    from about 16.0 wt % to about 16.9 wt % phosphorous; and
    less than about 0.8 wt % sulfate ion; wherein
    the ferric phosphate dihydrate material has a surface area of from about 25 $m^2/g$ to about 65 $m^2/g$; and
    the ferric phosphate dihydrate material is substantially free of metallic or magnetic impurities.

14. A method of synthesizing crystalline ferric phosphate material, comprising:
    a) combining iron (II) compound and an oxidizing agent in an aqueous solution and heating the solution at a first temperature between about 30 to about 65° C., forming amorphous ferric phosphate wherein the iron (II) compound is formed by combining an iron (II) salt and a phosphate salt wherein the phosphate salt comprises diammonium phosphate;
    b) collecting and washing the amorphous ferric phosphate to remove impurities; and
    c) crystallizing the amorphous ferric phosphate from step b) to form a crystalline ferric phosphate material comprising a molar ratio of phosphorus to iron is from about 1.001 to about 1.05;
    wherein step c) further comprises adding phosphoric acid and heating at a second temperature between about 85 to about 100° C.; and
    wherein the crystalline ferric phosphate material comprises less than 100 ppm metallic or magnetic impurities and less than 700 ppm sulfate impurities.

15. The method of claim 14, wherein one or more metallic traps are used to remove metallic or magnetic impurities in step a), step b), step c), after step c), or any combination thereof.

16. The method of claim 14, wherein the ferric phosphate material comprises ferric phosphate dihydrate.

17. The method of claim 15, wherein the magnetic trap comprises rare-earth magnets.

18. The method of claim 14, wherein the iron (II) salt comprises iron (II) sulfate, iron (II) chloride, iron (II) nitrate, any hydrate thereof, or a mixture thereof.

19. The method of claim 18, wherein the iron (II) salt comprises iron (II) sulfate heptahydrate.

20. The method of claim 14, wherein the oxidizing agent comprises hydrogen peroxide.

21. The method of claim 14, wherein the method further comprises washing the resulting crystalline ferric phosphate material.

22. The method of claim 16, wherein the synthesized crystalline ferric phosphate dihydrate material comprises:
   from about 28.3 wt % to about 29.6 wt % iron;
   from about 16.0 wt % to about 16.9 wt % phosphorous; and
   less than about 0.8 wt % sulfate ion; wherein
   the ferric phosphate dihydrate material has a surface area of from about 25 $m^2/g$ to about 65 $m^2/g$; and
   the ferric phosphate dihydrate material is substantially free of metallic or magnetic impurities.

* * * * *